United States Patent
Waagaard et al.

(10) Patent No.: US 7,715,015 B2
(45) Date of Patent: May 11, 2010

(54) ADAPTIVE MIXING FOR HIGH SLEW RATES

(75) Inventors: Ole Henrik Waagaard, Trondheim (NO); Erlend Rønnekleiv, Trondheim (NO)

(73) Assignee: Optoplan AS, Trondheim (NO)

( * ) Notice: Subject to any disclaimer, the term of this patent is extended or adjusted under 35 U.S.C. 154(b) by 264 days.

(21) Appl. No.: 11/924,409

(22) Filed: Oct. 25, 2007

(65) Prior Publication Data
US 2009/0111417 A1    Apr. 30, 2009

(51) Int. Cl.
*G01B 9/02* (2006.01)
(52) U.S. Cl. .................................................. 356/484
(58) Field of Classification Search ............... 356/484
See application file for complete search history.

(56) References Cited

U.S. PATENT DOCUMENTS

| | | | |
|---|---|---|---|
| 4,229,102 A * | 10/1980 | Wiklund et al. | ............ 356/5.12 |
| 4,789,240 A | 12/1988 | Bush | |
| 4,977,546 A | 12/1990 | Flatley et al. | |
| 5,471,300 A | 11/1995 | Ryan et al. | |
| 6,346,985 B1 | 2/2002 | Hall | |
| 6,606,186 B2 | 8/2003 | Maas | |
| 7,019,837 B2 | 3/2006 | Waagaard | |
| 7,081,959 B2 | 7/2006 | Waagaard et al. | |
| 7,088,878 B2 | 8/2006 | Waagaard et al. | |
| 7,480,496 B2 * | 1/2009 | Noda et al. | .................. 455/130 |
| 2006/0181711 A1 | 8/2006 | Waagaard et al. | |

FOREIGN PATENT DOCUMENTS

WO    02063237 A2    8/2002

OTHER PUBLICATIONS

Extended European Search Report dated Feb. 10, 2009.

* cited by examiner

*Primary Examiner*—Michael A Lyons
(74) *Attorney, Agent, or Firm*—Patterson & Sheridan, LLP

(57) ABSTRACT

A method and apparatus for demodulation of detected fringes from interferometric sensors with high slew rates are provided. A detected interference signal may be mixed with a local oscillator phasor to obtain a mixed signal, the local oscillator being controlled to produce a frequency that roughly matches the fringe frequency of the interference signal. A sensor phase estimate may be obtained from the detected interference signal or the mixed signal. The local oscillator signal can be computed from the sensor phase estimate. The mixed signal and the sensor phase estimate may be low pass filtered and decimated and the resulting decimated mixed signal and decimated sensor phase estimate may be processed and combined with moderate processing power requirements in an effort to accurately measure the sensor phase for the interferometric sensor.

25 Claims, 16 Drawing Sheets

US 7,715,015 B2

ADAPTIVE MIXING FOR HIGH SLEW RATES

BACKGROUND OF THE INVENTION

1. Field of the Invention

Embodiments of the present invention generally relate to optical signal processing techniques and, more particularly, to optical signal processing of interrogation signals received from time-division multiplexed (TDM) interferometers.

2. Description of the Related Art

Marine seismic exploration surveys for the exploration and monitoring of hydrocarbon producing zones and reservoirs utilize seismic cables having sensor arrays, i.e., a plurality of sensor stations interconnected by sections of cable. The cable arrays may include a large number of sensor stations (e.g., several hundreds or thousands) and may be buried in a predetermined pattern on the ocean floor. Optical sensors may be particularly well-suited for ocean bottom seismic (OBS) applications, due to their robust nature, lack of sensitive electronics, and potential for lightweight sensors and cable assemblies that are relatively inexpensive to install. An optical sensor station may include a number of interferometric sensors, such as optical hydrophones, accelerometers along multiple axes, and/or geophones.

An interferometric sensor system may comprise a transmitter unit that produces an interrogation signal for the interferometric sensors, a sensor network, and a receiver unit that detects the signals from the sensor network. The sensor network may comprise several optical pathways from its input to its output, and some pairs of optical pathways form sensor interferometers. These optical pathways are called sensor pathways. Each sensor interferometer comprises a sensor and lead paths, the parts of the two sensor pathways that are not common define the sensor, while the common parts define the lead paths. In a fiber optic sensor network the lead paths are called lead fibers. The portion of the lead paths between the transmitter unit and a sensor is called the down-lead path and the portion of the lead paths between a sensor and the receiver unit is called the up-lead path. The portion of the lead paths that are common to both the down-lead path and the up-lead path is called the common lead path, or common lead fiber for a fiber optic sensor network. The sensors interferometer can be Michelson interferometers, Mach-Zehnder interferometers or Fabry-Perot interferometers. The sensor network can be a number of topologies, including a star network, a ladder network, a transmissive serial array, a serial Michelson array or an inline Fabry-Perot sensor array. The different paths through the sensor network may typically be formed by optical waveguides and splitters like optical fibers, optical splitters, circulators, and other waveguide coupled components, or free space optical paths, mirrors, beam splitters and other bulk components. The time delay difference $\tau_s$ between the two sensor pathways is called the imbalance of that sensor, which is typically equal for all sensors.

The sensor phase, which is the phase delay difference between the two sensor pathways, can be made sensitive to some physical property that one wants to measure. Thus, information about the physical property can be found by using time-division multiplexing (TDM), for example, and extracting the phase of the interference (optically detected as a fringe signal) between the interrogation signal that has propagated the two sensor pathways. TDM of an interferometric sensor network is a form of pulsed interrogation that is achieved by producing light pulses within the transmission unit and transmitting the pulses into the sensor network in one or more pulse transmission time intervals. Signal processing means may periodically measure the phase of the fringe signal to thereby measure changes in the physical property.

A fundamental difference between an interferometric sensor and most electronic sensors is that the phase of a real sinusoidal signal (the fringe signal) is extracted. Not only should the bandwidth of the sensor signal be taken into consideration, but the bandwidth of the fringe signal should also be considered for an interferometric sensor. The bandwidth of the sensor signal may be on the order of a few hundred Hz, for example. For small sensor signals less than 1 rad, the bandwidth of the fringe signal is approximately equal to the bandwidth of the sensor signal. However, for sensor signals larger than $2\pi$, the bandwidth of the fringe signal is equal to the derivative of the phase, i.e., the slew rate of the sensor signal. For interferometric applications with a large dynamic range required for demodulation, such as OBS where the strong first brake from the gun array and weak reflections from the ground layers are both demodulated, conventional demodulation techniques may suggest a relatively large bandwidth to demodulate the fringe signal, even though the bandwidth of the sensor signal may be orders of magnitude lower. Thus, conventional demodulation techniques may require considerable computation resources and may even be impossible to implement for some signal processing systems.

One solution to the problem of processing interferometric signals having high fringe rates is described in U.S. Pat. No. 6,606,186 to Maas, entitled "Dynamic Fiber Optic Sensor Signal Processing Scheme," filed Jul. 25, 2001. In an effort to optimize bandwidth utilization of demodulators in a system for seismic signal processing, Mass teaches the use of two demodulators, wherein the bandwidth of one demodulator is greater than the bandwidth of the other demodulator, and an optical switch having a switch control input electronically coupled to the output of a fringe rate detector. The optical signals are switched among the demodulators depending on the fringe rates such that signals are only routed to the high performance demodulator (i.e., the demodulator with the higher bandwidth capable of processing signals having high fringe rates) when necessary. In one aspect of the invention, optical signals are routed to a first demodulator, the fringe rate for each of the optical signals is sensed, and a signal line having fringe rates exceeding a threshold fringe rate is detected. The method further comprises rerouting the signal lines to a second demodulator, detecting a condition of the signal line, and rerouting the signal line from the second demodulator back to the first demodulator when the signal line has fringe rates below the threshold fringe rate input for the first demodulator. However, this technique requires a second high performance demodulator, an optical switch for routing signals between the two demodulators, and logic to control the optical switch.

Accordingly, there is a need for optical signal processing techniques, apparatus, and systems that effectively reduce the bandwidth of the fringe signal in interferometric sensors such that a large dynamic range in the demodulated sensor phase is achieved.

SUMMARY OF THE INVENTION

Embodiments of the present invention generally relate to optical signal processing methods, apparatus and systems for interferometric sensors.

One embodiment of the present invention is a method for detecting a sensor phase in an interferometric system. The method generally includes mixing a detected interference signal with a local oscillator phasor in one or more steps to create a mixed signal, obtaining a parameter dependent on the phase of the mixed signal, obtaining the local oscillator phasor based on the parameter dependent on the phase of the mixed signal, signal processing the mixed signal and the parameter dependent on the phase of the mixed signal, and extracting the sensor phase from the processed mixed signal and the processed parameter. The parameter dependent on the phase of the mixed signal may be the phase or the frequency of the mixed signal.

Another embodiment of the present invention is a method for detecting a sensor phase in an interferometric system. The method generally includes shifting a detected interference signal in frequency by an estimated frequency, obtaining a parameter dependent on the phase of the frequency-shifted signal, obtaining the estimated frequency based on the parameter dependent on the phase of the frequency-shifted signal, signal processing the frequency-shifted signal and the parameter dependent on the phase of the frequency-shifted signal, and extracting the sensor phase from the processed frequency-shifted signal and the processed parameter. The parameter dependent on the phase of the detected interference signal may be the phase or the frequency of the detected interference signal.

Yet another embodiment of the present invention is a method for detecting a sensor phase in an interferometric system. The method generally includes estimating a parameter dependent on the phase of a detected interference signal, obtaining a local oscillator phasor based on the parameter dependent on the phase of the detected interference signal, mixing the detected interference signal with the local oscillator phasor in one or more steps to create a mixed signal phasor, signal processing the mixed signal phasor and the parameter dependent on the phase of the detected interference signal, and extracting the sensor phase from the processed mixed signal phasor and the processed parameter. The parameter dependent on the phase of the detected interference signal may be the phase or the frequency of the detected interference signal.

Yet another embodiment of the present invention provides an interferometric system. The interferometric system generally includes a plurality of optical sensors; a transmitter configured to transmit optical signals to the plurality of optical sensors; a receiver configured to detect interference signals produced by the plurality of optical sensors and based on the transmitted optical signals; and a signal processing unit. The signal processing unit is generally configured, for each of the detected interference signals, to mix the detected interference signal with a local oscillator phasor in one or more steps to create a mixed signal, obtain a parameter dependent on the phase of the mixed signal, obtain the local oscillator phasor based on the parameter, signal process the mixed signal and the parameter, and extract the sensor phase from the processed mixed signal and the processed parameter.

Yet another embodiment of the present invention provides an interferometric system. The interferometric system generally includes a plurality of optical sensors; a transmitter configured to transmit optical signals to the plurality of optical sensors; a receiver configured to detect interference signals produced by the plurality of optical sensors and based on the transmitted optical signals; and a signal processing unit. The signal processing unit is generally configured, for each of the detected interference signals, to estimate a parameter dependent on the phase of the detected interference signal, obtain a local oscillator phasor based on the parameter, mix the detected interference signal with the local oscillator phasor in one or more steps to create a mixed signal phasor, signal process the mixed signal phasor and the parameter, and combine the processed mixed signal phasor with the processed parameter to extract the sensor phase.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the invention generally relate to optical signal processing methods, apparatus, and systems that effectively reduce the bandwidth of the fringe signal in interferometric sensors.

Ocean bottom seismic (OBS) sensing systems are described below as a particular, but not limiting, example of an application in which embodiments of the present invention may be used to advantage. However, those skilled in the art will recognize that the concepts described herein may be used to similar advantage in a wide variety of other applications in which a large number of optical sensors are interrogated.

Further, while embodiments of the present invention will be described with reference to optical fibers, those skilled in the art will recognize that any type of suitable optical waveguide may be used as well. Further, while embodiments of the present invention will be described with reference to sensor elements utilizing inline reflective elements such as fiber Bragg gratings (FBGs) to create interferometers, those skilled in the art will recognize that concepts described herein and recited in the claims may, in some cases, also be applied to interferometers utilizing transmissive elements (with analogies drawn between transmissive properties and reflective properties) and, more generally, to a wide variety of optical sensors.

Moreover, mixing is described below as a particular, but not limiting, example of frequency shifting which may be employed in the signal processing techniques of the present invention described herein. However, those skilled in the art will recognize that any type of frequency shifting for signal processing may be used to similar advantage.

An Exemplary Interferometer System

Figure 1:
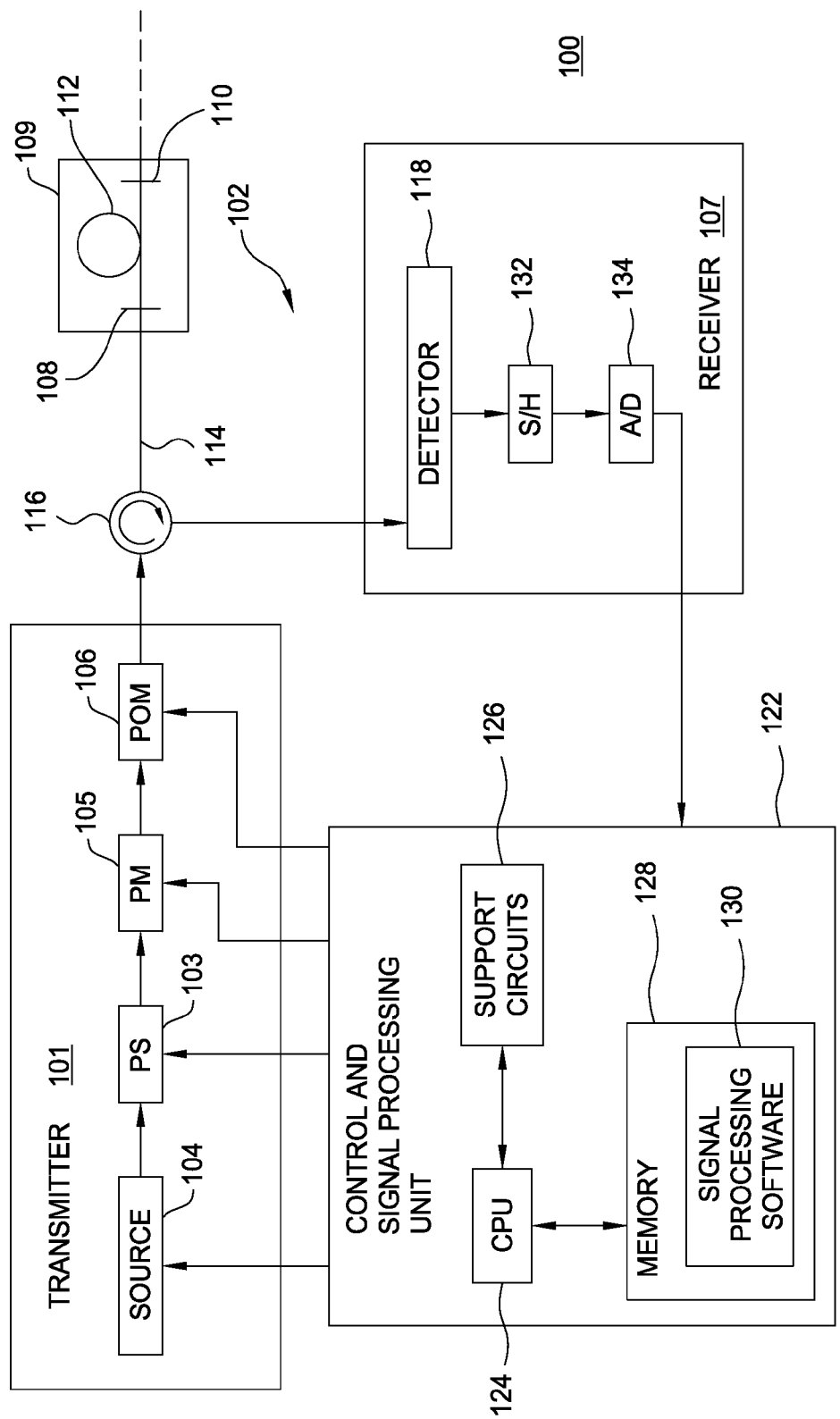
FIG. 1 is a block diagram of an optical interferometer system in accordance with an embodiment of the present invention.

FIG. 1 depicts an optical interferometer sensor system 100, which may be used to generate a fringe signal, as described in U.S. Pat. No. 7,081,959, entitled "Method and Apparatus for Providing Polarization Insensitive Signal Processing for Interferometric Sensors," commonly owned with the present application, herein incorporated by reference in its entirety. The optical interferometer sensor system 100 may comprise a transmitter 101, a receiver 107, an optical circulator 116, a sensor array 102, and a control and signal processing unit 122. The transmitter 101 may comprise a source 104, a pulse shaper 103, a phase modulator 105, and a polarization modulator 106. The pulse shaper 103 may comprise one or more Mach-Zehnder electro-optic modulators, acousto-optic modulators (Bragg cells), or the like to form optical pulses. The pulse shaper 103 may also comprise a compensating interferometer with an imbalance substantially equal to the sensor imbalance to clone one pulse into two pulses. The receiver 107 may comprise a detector 118, a sample-and-hold (S/H) circuit 132, and an analog-to-digital (A/D) converter 134. The source 104 may be a light source, such as a laser, and may be capable of producing light signals with multiple wavelengths.

While the interferometer sensor system 100 illustrated in FIG. 1 includes separate transmitter, receiver, and signal processing units, some embodiments may provide a unit for performing all or a combination of these functions. The light from the source 104 may be pulsed by pulse shaper 103, phase modulated by phase modulator 105, and have its polarization modulated by the polarization modulator 106 in an effort to form interrogation pulses that allow for interrogation that is insensitive to polarization-induced phase noise. Optical fibers (not shown) may be employed to couple the components of the transmitter 101 to one another, and preferably, these fibers should be polarization-maintaining fibers so that the polarization into the polarization modulator 106 does not vary. The modulated light produced by the transmitter 101 may be coupled to the sensor array 102 through the circulator 116.

The sensor array 102 may comprise one or more Fabry-Perot (FP) interferometers having a lead fiber optic cable 114, a reference reflector 108, at least one length of fiber optic cable 112, and at least one sensor reflector 110. A sensor 109 may be formed by a length of fiber between reflectors (e.g., fiber 112 between reflectors 108 and 110). The reflectors 108 and 110 may be fiber Bragg gratings (FBGs) that are formed along the fiber. The sensor 109 may be used to measure various properties which affect the length of fiber optic cable 112 by a measurable amount, such as changes in temperature, pressure, acceleration, and strain. The sensor array 102 may contain multiple sensors 109 that may be positioned along one or more parallel fibers that branch from the lead fiber 114, and each of these fibers may contain multiple sensors 109 in series.

Figure 2:
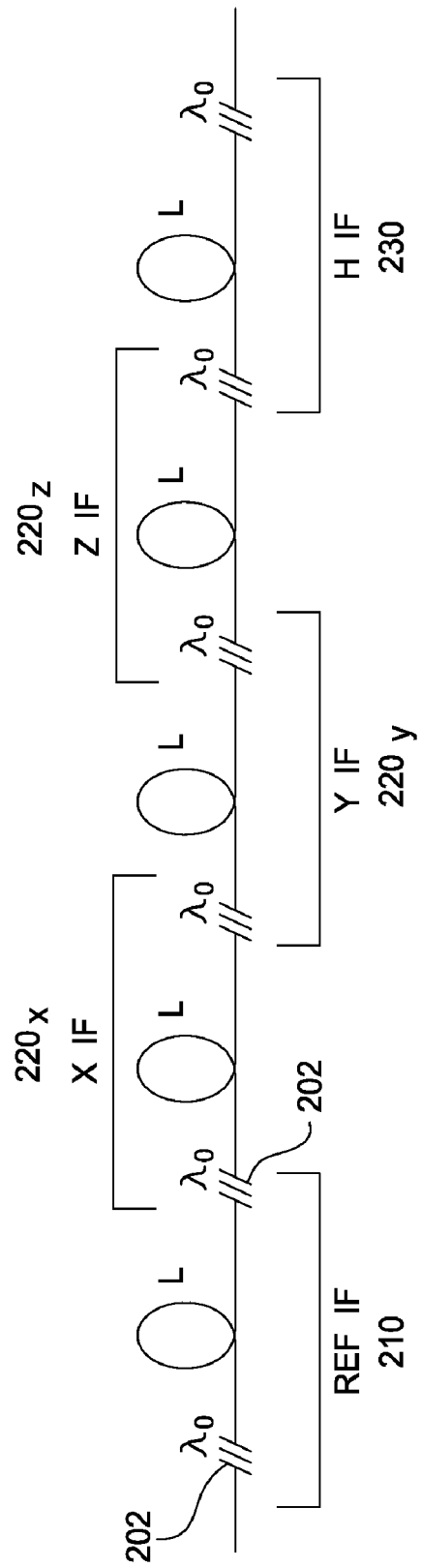
FIG. 2 illustrates a basic configuration of ocean bottom seismic (OBS) sensors in accordance with an embodiment of the present invention.

For example, FIG. 2 illustrates a basic configuration of multiple sensors 109 in a sensor station that may be used in ocean bottom seismic (OBS) sensing applications, for example, as described in U.S. patent application Ser. No. 11/381,880 filed May 5, 2006 (WEAT/0732), herein incorporated by reference in its entirety. In the illustrated arrangement, the housing (not shown) of the sensor station may contain a reference interferometer 210; orthogonal X, Y, and Z accelerometers 220 ($220_X$, $220_Y$, and $220_Z$, respectively); and a hydrophone 230. As described in the above-referenced application, the accelerometers 220 may be arranged in some type of liquid-filled compartment of the housing for dampening of mechanical resonances caused by mechanical disturbances and pressure fluctuations. The housing may also include a mechanism for transferring pressure variations between the surrounding environment and an inside of a second compartment containing the optical fiber coil of the hydrophone 230. The reference interferometer 210 may be used to compensate for interrogating laser frequency fluctuations or phase perturbations in a compensating interferometer or in the lead cable as described in the commonly-owned U.S. Pat. No. 7,245,382, filed Oct. 24, 2003 entitled "Downhole Optical Sensor System with Reference."

Each of the interferometric sensors 210, 220, 230 may be formed by a length of fiber (e.g., a coil such as the length of fiber optic cable 112) separating a pair of reflective elements, such as gratings 202 formed therein. For some embodiments, the gratings 202 may be fiber Bragg gratings (FBGs). The gratings may share a common wavelength ($\lambda_0$) and, thus, may be interrogated via time-division multiplexing (TDM). Further, the optical properties of the gratings, including the features of the reflective spectrum, may be controlled to reduce cross-talk between sensors within the same station, as well as sensors from other stations. For some embodiments, the gratings may be formed in the fiber section, with appropriate spacing prior to wrapping the coils. Forming the gratings in this manner may eliminate the need for splices between sensors, reducing loss, manufacturing time and, thus, overall cost.

While each sensor may be formed by two gratings, gratings may be shared between sensors, such that only M+1 gratings are required for M interferometric sensors. For example, in the illustrated arrangement, six gratings with overlapping channel (reflection) bands are used to form the five sensors shown.

Any change in the optical path lengths between the fiber Bragg gratings, as will typically result from external influences on the accelerometer or hydrophone fiber coils, will alter the resulting superposed reflected signal from such a seismic sensor station. U.S. Published Patent Application No. 2005/0097955, entitled "Highly Sensitive Accelerometer," describes examples of interferometric accelerometers for determining acceleration and methods of fabricating such accelerometers. Therein, the accelerometers are based on a rigid frame, a mass movably suspended on the rigid frame and a sensing coil partially wrapped around surfaces of first and second elements to detect movement of the mass in response to an acceleration based on a change in length of the sensing coil.

Referring back to FIG. 1, other types of interferometers may function in the context of the present invention including Michelson interferometers, Mach-Zehnder (MZ) interferometers, and the like. No matter the type of interferometer, the amplitude of the reflected interference signal at detector 118 may vary according to the phase difference between the light that has propagated the sensor path (e.g., lead fiber 114, fiber 112, and sensor reflector 110) and the light that has propagated the reference path (in the FP interferometer, the reference arm comprises lead fiber 114 and reference reflector 108). The phase difference between the sensor and the reference path may be made sensitive to a physical measurand such as acceleration and pressure. In other embodiments, the interferometer may contain two sensor paths, where both paths are sensitive to a measurand, but typically with opposite sign. The circulator 116 may channel light reflected from the sensor array 102 to the detector 118. For some embodiments, a directional coupler may be utilized as an alternative for this purpose. The analog output of the detector 118 may be sampled and held by the S/H circuit 132 so that the A/D converter 134 can digitize a stable signal during its sampling period rather than a highly dynamic signal. The interference signal of combined light components received from both reflectors 108, 110 may be measured, and changes in the pattern may indicate a relative physical disturbance of the sensor.

The source 104, the pulse shaper 103, the phase modulator 105, and the polarization modulator 106 may be controlled by the control and signal processing unit 122. The control and signal processing unit 122 may comprise a central processing unit (CPU) 124, support circuits 126, and memory 128. The CPU 124 may be any processing unit that is capable of signal processing as well as controlling system functionality. Although a single CPU 124 is shown and discussed herein, those skilled in the art will realize that multiple processing units may be used wherein one processing unit may be used for controlling the components of the transmitter 101 and another processor may be used for signal processing, for example. The support circuits 126 may comprise well-known circuits, such as cache, power supplies, timing circuitry, input/output circuits, and the like. The memory 128 may comprise one or more of random access memory (RAM), read-only memory (ROM), removable storage, disk drive storage, and the like. The memory 128 may store signal processing software 130 that facilitates computing the sensor phase of the reflected signals from the sensor array 102. Field programmable gate arrays (FPGAs) or application specific integrated circuits (ASICs) may also be incorporated, containing logical circuits which can be configured to perform computational and memory functions in highly efficient and dedicated ways. The control and signal processing unit 122 may then output or display the computed sensor phase on any suitable input/output (I/O) device (not shown), such as a serial or parallel interface, a printer, a cathode ray tube (CRT) monitor, a liquid crystal display (LCD) monitor, a light-emitting diode (LED) monitor, and the like.

The optical interferometer sensor system 100 may use time-division multiplexing (TDM) to form the interrogation signal by controlling the source 104, the pulse shaper 103, the phase modulator 105, and the polarization modulator 106. The pulse shaper 103 may produce a pair of pulses with a separation equal to the sensor imbalance within each TDM repetition period. The phase modulator 105 and polarization modulator 534 may modulate the phase difference between pulses in interrogating pulse pairs with a subcarrier frequency $f_{sc}$ that will result in subcarrier modulation of the interference signals reflected from the sensors allowing for sensor phase demodulation without ambiguity, and to perform polarization conditioning for polarization insensitive sensor interrogation, for example, in accordance with commonly owned U.S. Pat. Nos. 7,088,878, entitled "Method and Apparatus for Producing Depolarized Light," and 7,081,959, entitled "Method and Apparatus for Providing Polarization Insensitive Signal Processing for Interferometric Sensors." In addition, the common phase or frequency of interrogating pulse pairs may be modulated to reduce cross-talk and noise caused by unwanted reflections in the system, according to the commonly owned U.S. patent application Ser. No. 11/056,970, entitled "Method and Apparatus for Suppression of Cross-Talk and Noise in Time-Division Multiplexed Interferometric Systems," all of which are herein incorporated by reference in their entirety.

The sensor(s) 109 may reflect the interrogation signal, reflections from the sensor(s) 109 may then be detected and converted to analog electrical signals by the detector 118, and the analog electrical signals may be converted to digital signals for signal processing, such as demodulation, by the S/H circuit 132 and the A/D converter 134. In certain interferometric sensor applications, such as OBS sensing, a large dynamic range may be required to demodulate the first brake (the direct signal from the source 104, a gun array for some embodiments, which is typically a strong signal) and weak reflections from the layers in the ground.

Figure 3A:
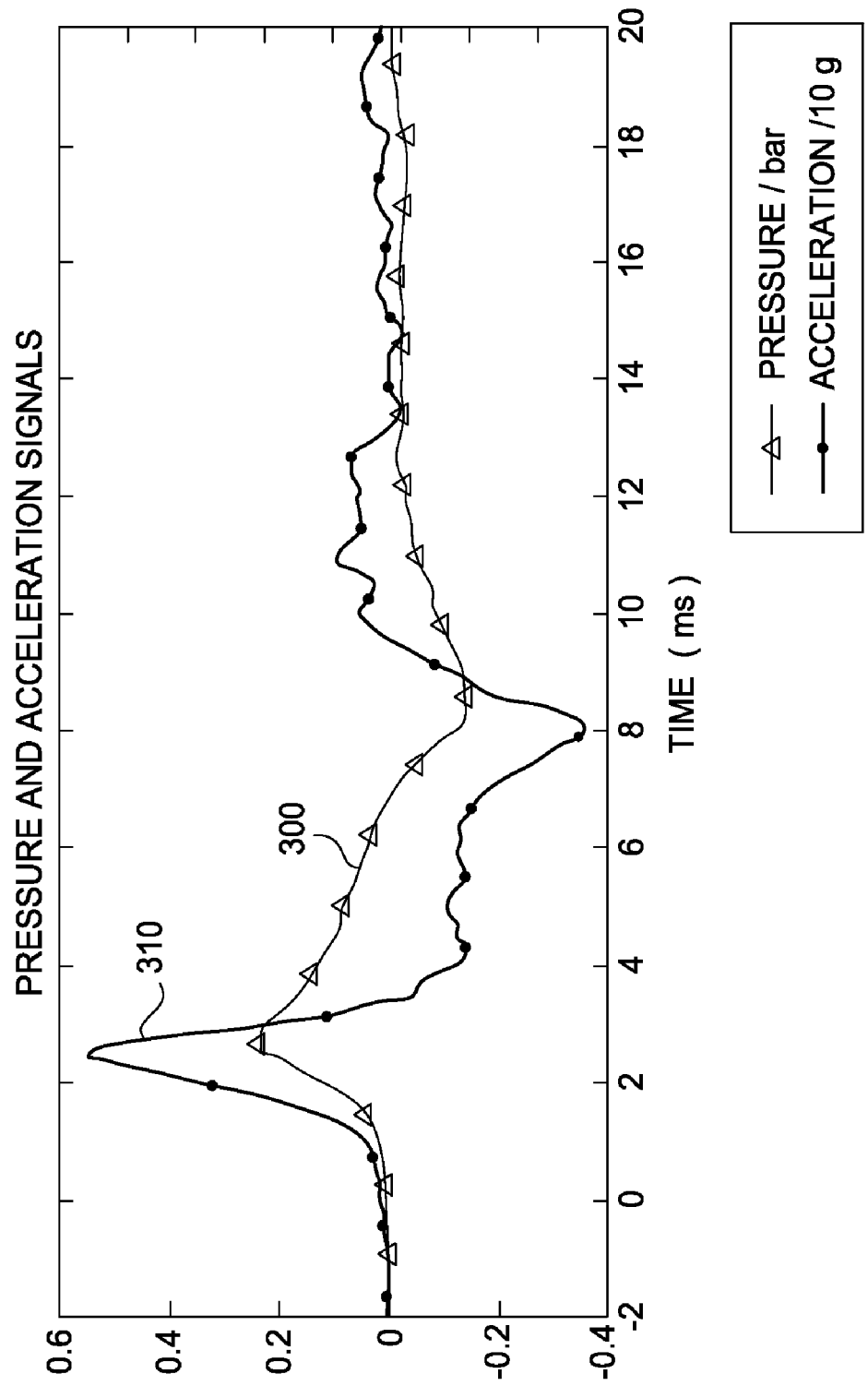
FIGS. 3A-D are graphs of converted sensor phase, sensor phase, fringe rate, and spectral density, respectively, for pressure and acceleration measurements of a first brake in an OBS application in accordance with embodiments of the present invention.
Figure 3B:
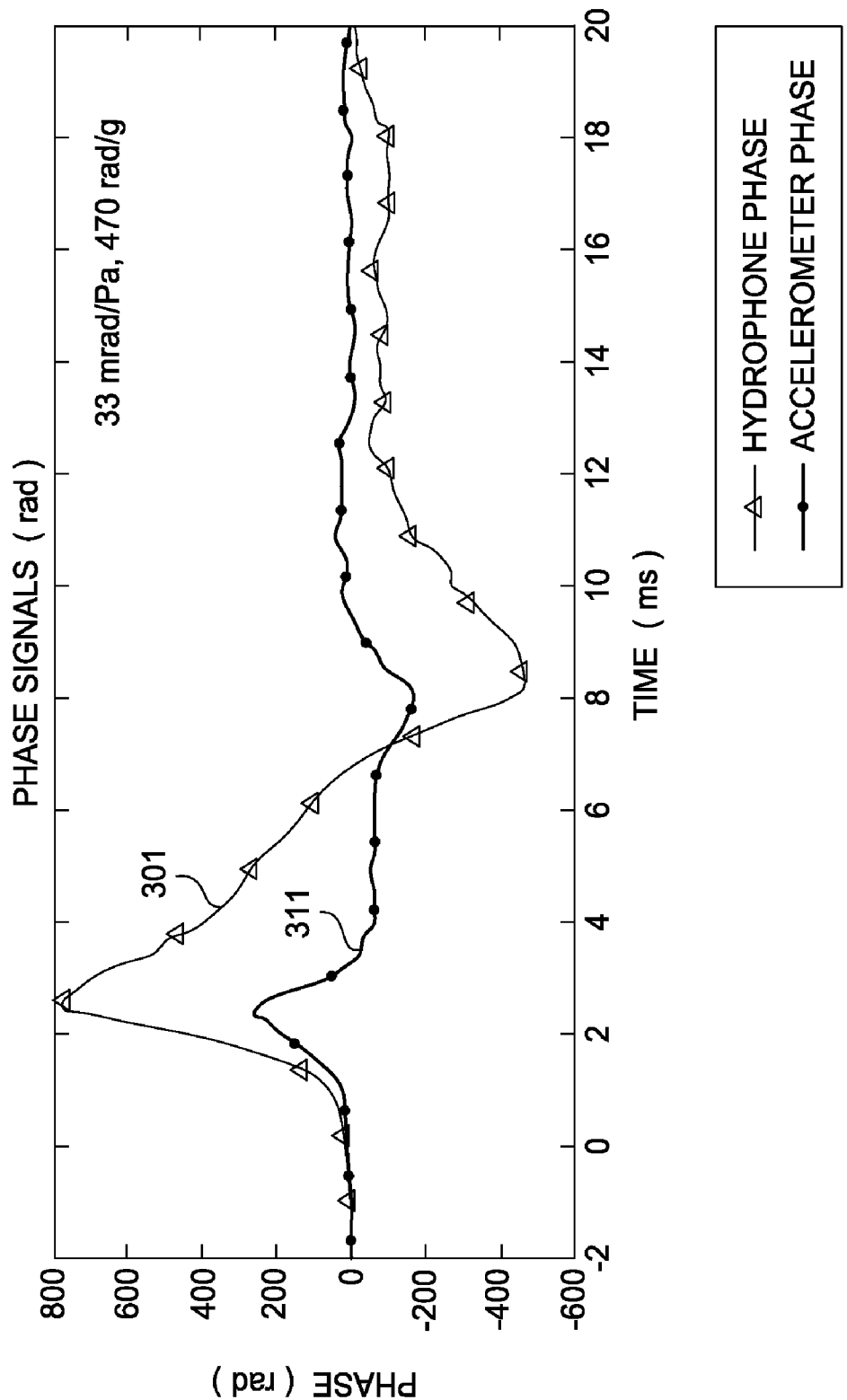

FIGS. 3A and 3B illustrate a typical OBS pressure signal 300 in bars over time in milliseconds (ms) of the first brake, which may be measured by reflected signals from the hydrophone 230, and corresponding hydrophone sensor phase 301 in radians (rad), respectively, with a conversion of 33 mrad/Pa. A typical accelerometer signal 310 per g over time in ms of the same first brake, which may be measured by reflected signals from the accelerometer 220, and corresponding accelerometer sensor phase 311 in rad, respectively, with a conversion of 470 rad/g, is also depicted.

Figure 3C:
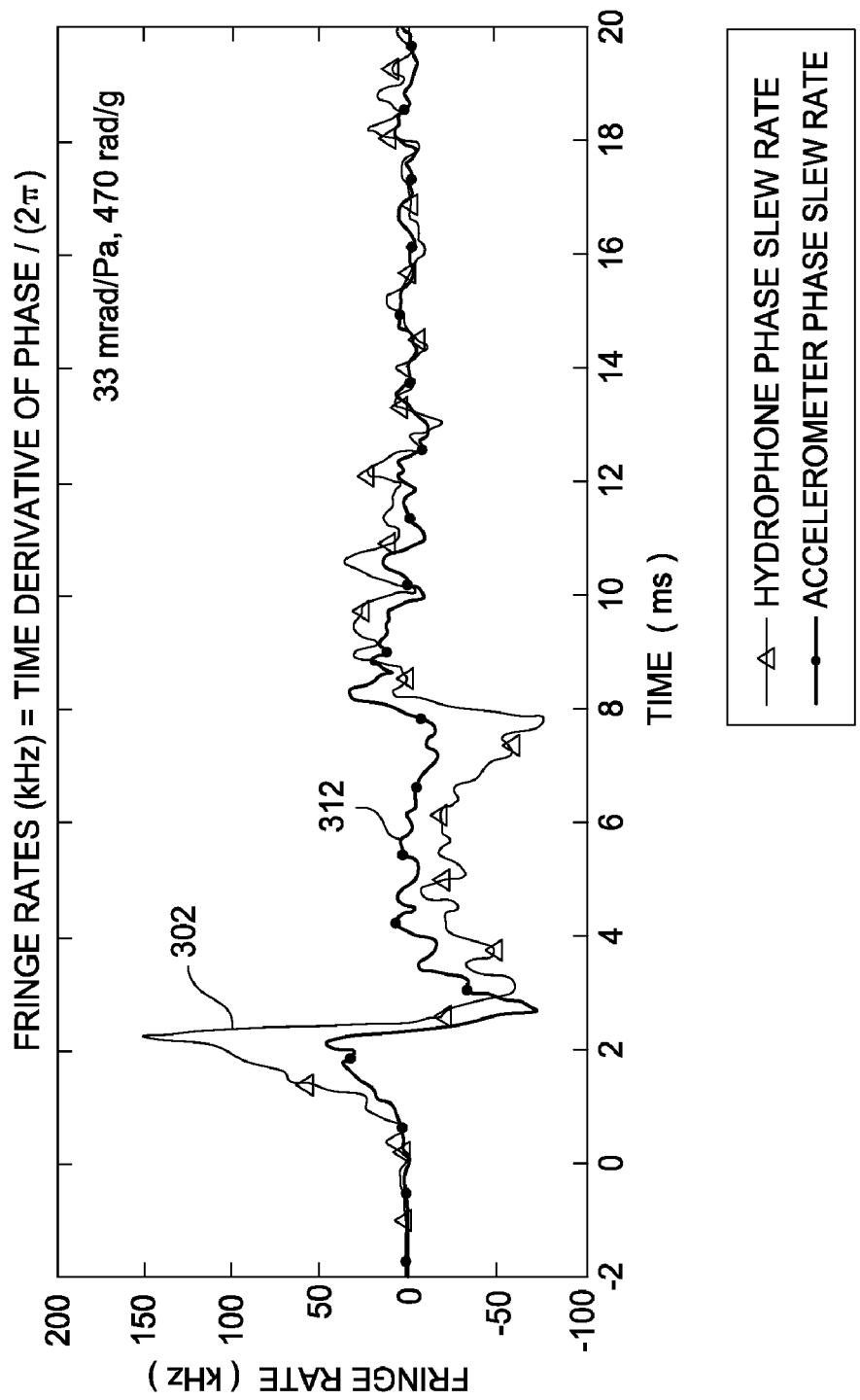

By taking the derivative of the pressure and accelerometer signals 300 and 310 divided by $2\pi$, the fringe rate (the signal speed for the rate of change of the sensor phase, also called the slew rate) for pressure (the hydrophone fringe rate 302) and acceleration (the accelerometer fringe rate 312) over time may be determined as illustrated in the graph of FIG. 3C. The hydrophone fringe rate 302 may exceed 220 kHz peak-to-peak, and the accelerometer fringe rate 312 may exceed 110 kHz peak-to-peak as shown.

Figure 3D:
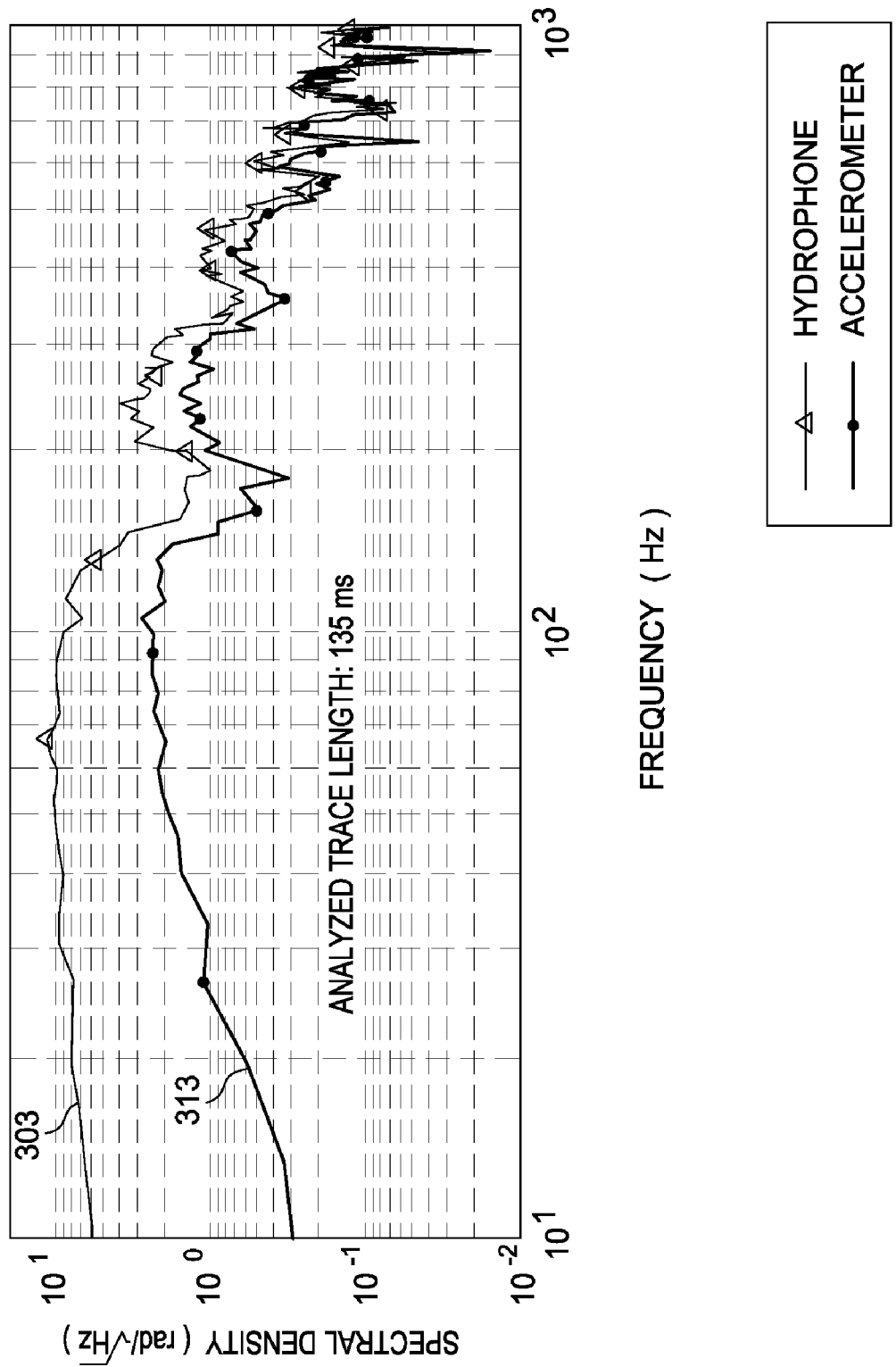

FIG. 3D illustrates the hydrophone spectral density 303 and the accelerometer spectral density 313 corresponding to the hydrophone fringe rate 302 and the accelerometer fringe rate 313, respectively, showing that the bandwidth of the sensor signal is typically about 1 kHz. Even though the bandwidth of the sensor signal may be less than 1 kHz, the bandwidth of the fringe signal may be as large as 110 or even 220 kHz. At shallower waters or with larger seismic sources, the bandwidths may be even larger. The bandwidth of the fringe signal is therefore determined by the slew rate and not the bandwidth of the sensor signal.

Figure 4A:
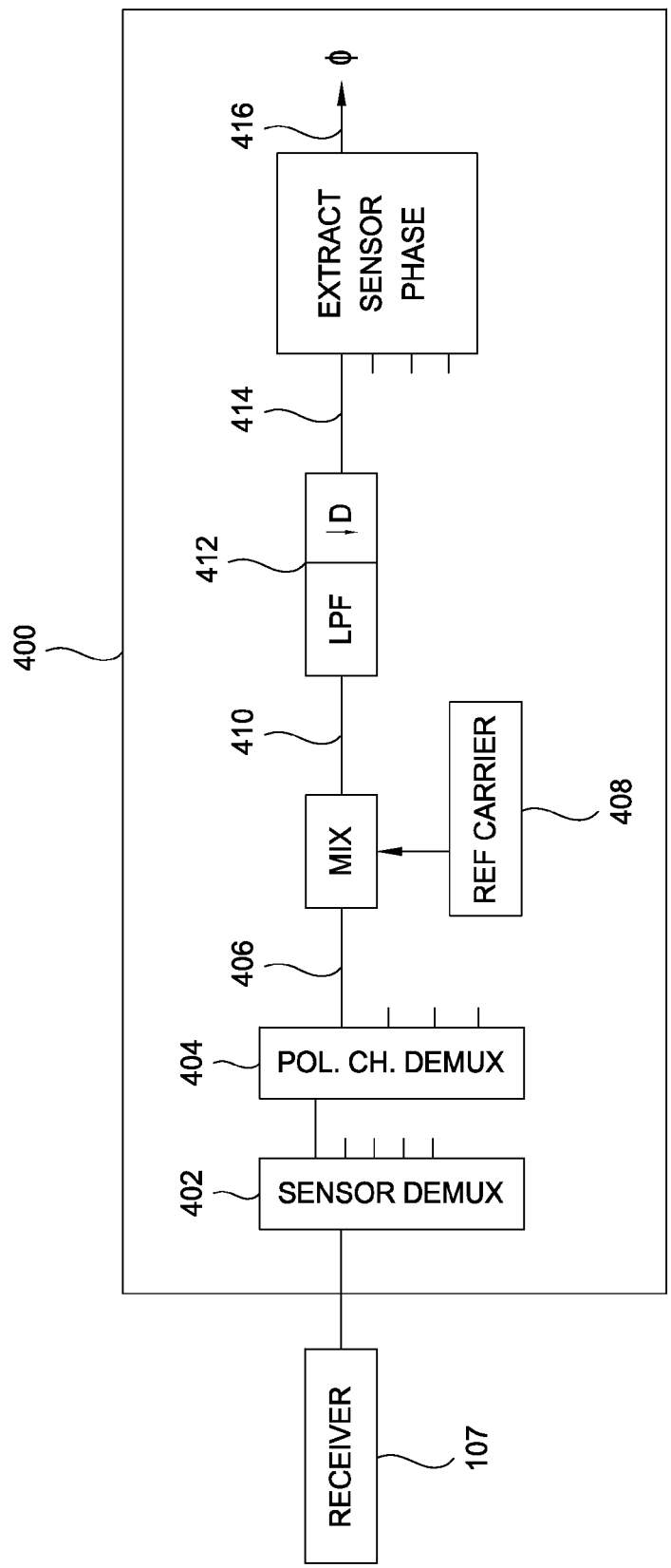
FIG. 4A illustrates a method of mixing a polarization channel of a sensor with a constant local oscillator frequency to determine the sensor phase in accordance with the prior art.

With conventional demodulation techniques, the demodulator would operate with at least twice the peak-to-peak fringe rate and, as illustrated in FIG. 4A, this would suggest operating the demodulator at 250 or even 500 kHz, thereby consuming considerable computational resources. In FIG. 4A, the receiver 107 receives the reflected interferometric signals from the one or more sensors, such as the accelerometers 220 or hydrophone 230, each sampled at a sampling frequency ($f_s$) equal to the repetition rate of the interrogation pulses and converts them to digital signals to be processed by the demodulator 400, which may be part of the control and signal processing unit 122. The demodulator 400 may separate the received signals by sensor in the sensor demultiplexer (demux) 402 (five different sensor signals are shown) and by polarization channel in the polarization channel demux 404 (four different polarization channels are shown).

As used herein, a polarization channel generally refers to the transmitted and/or the corresponding received light components having a certain combination of polarization states. For example, consider two polarization states: x and y. A polarization channel may be composed of all of the received light components having polarization state x. As another example when transmitting pulse pairs (i.e., two optical pulses having the same or different polarization states), a polarization channel xy may include all of the received light components originating from interference between the pulses of transmitted pulses pairs with the first pulse having polarization state x and the second pulse having polarization state y.

A given polarization channel signal 406, with a clock rate of $f_s/4$, may be mixed with a reference carrier 408 at the subcarrier frequency ($f_{sc}$), for example. The sub-carrier frequency $f_{sc}$ is typically $f_s/16$, which is half the Nyquist frequency for a polarization channel, so that the sensor signal is centered halfway between 0 and the Nyquist frequency. The resulting mixed signal 410 may be low pass filtered and decimated in one or more digital low pass/decimation filters 412, and the sensor phase 416 may be extracted by combining the result 414 with similar results obtained from mixing the other polarization channel signals with the same reference carrier and low-pass filtering and decimating them. Possible crosstalk due to multiple reflections in other sensors may be removed by using an inverse scattering algorithm, such as layer-peeling that takes into account the mixed, decimated and low-pass filtered signals from the other sensors. Suitable layer-peeling algorithms are described in detail in the commonly owned U.S. Pat. No. 7,019,837, entitled "Method and Apparatus for Reducing Cross-Talk Interference in an Inline Fabry-Perot Sensor Array," herein incorporated by reference.

An Exemplary Method of Adaptive Mixing

Figure 4B:
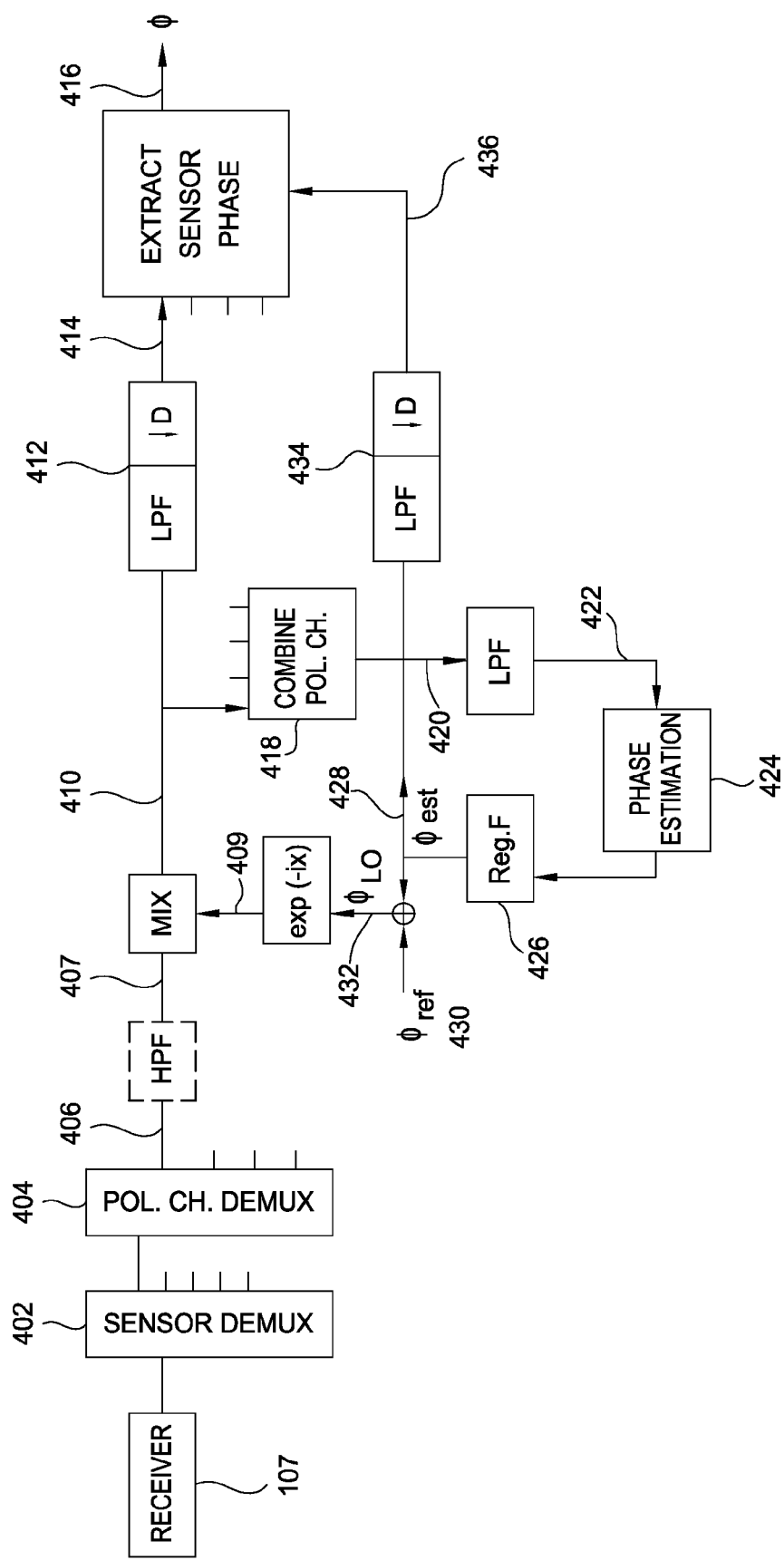
FIGS. 4B-C illustrate two different methods of adaptive mixing in accordance with embodiments of the present invention.
Figure 5A:
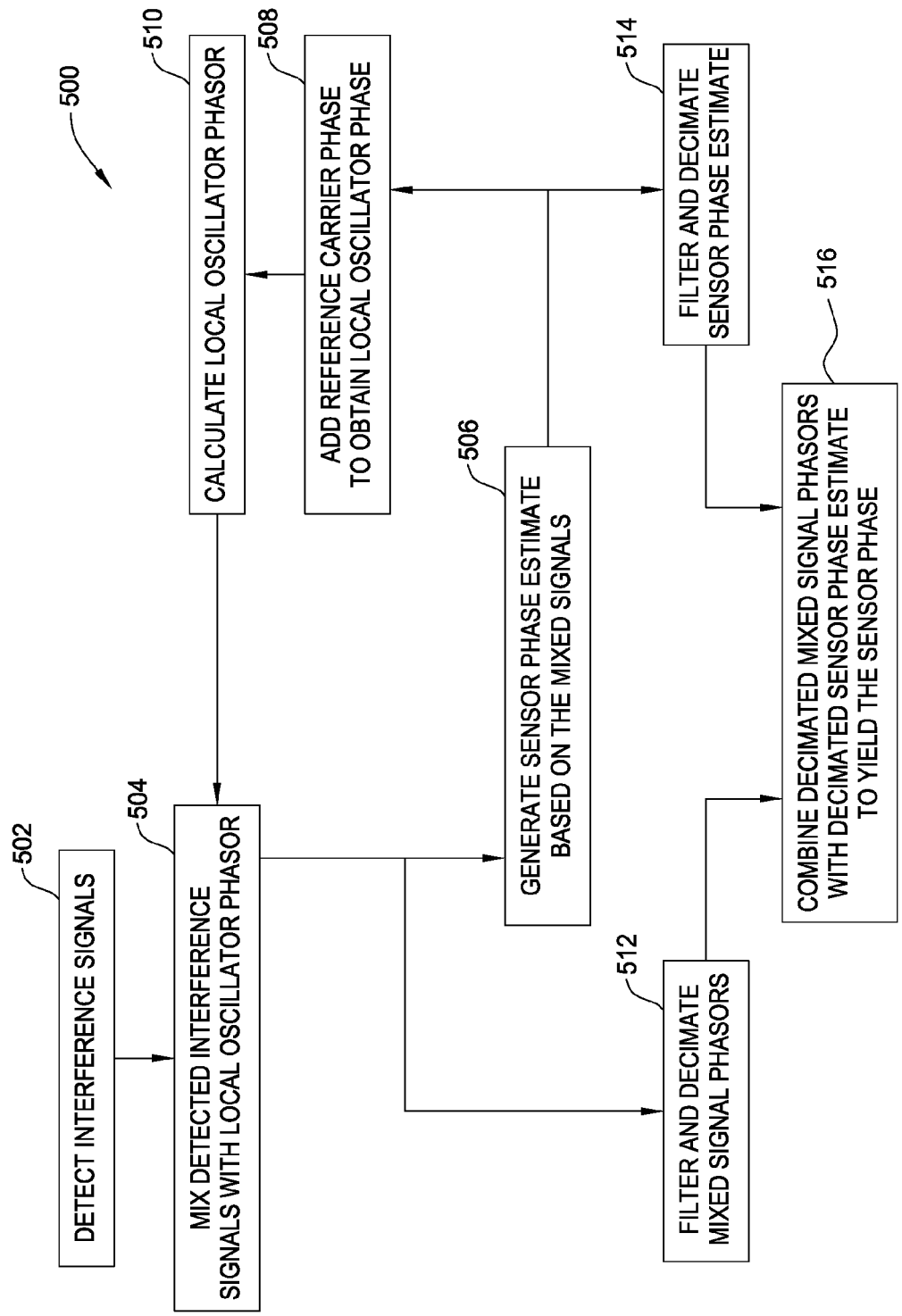
FIGS. 5A-B are flow diagrams for the methods of adaptive mixing in FIGS. 4B-C, respectively, in accordance with embodiments of the present invention.

In an effort to significantly reduce the bandwidth requirements for sensing high slew rate fringe signals and hence, the computational resources, the demodulator 400 may employ the techniques of adaptive mixing as illustrated in the block diagram of FIG. 4B and the flow diagram 500 of FIG. 5A. Rather than using a constant local oscillator frequency, such as the reference carrier, the concept of adaptive mixing for some embodiments is to estimate the sensor phase early in the demodulation process, calculate a rotation phasor (known as the local oscillator) based on the sensor phase estimate, and mix the local oscillator with the fringe signal. In this manner, the bandwidth of the fringe signal for a given sensor, as well as the demands on computational resource allocation of the interferometer system 100, may be significantly reduced.

In step 502, the receiver 107 may detect the reflected interferometric signals from the interferometric sensor(s) sampled at the sampling frequency ($f_s$) and may convert them to digital signals to be processed by the control and signal processing unit 122, for example. The received signals may be separated according to the associated sensor by the sensor demux 402 and according to the polarization channel by the polarization channel demux 404. The polarization channel signal 406 may be passed through an optional high pass filter (HPF), such as an infinite impulse response (IIR) filter, in an effort to remove DC components from the signal 406.

The high-pass filtered signal 407 (or the polarization channel signal 406) may be mixed with a local oscillator phasor 409 in step 504 to generate a mixed signal 410. The local oscillator phasor 409 may be calculated in an adaptive mixing feedback loop based on one numerical oscillator for each sensor that is configured to follow the sensor fringe frequency. The mixed signals 410 from each of the polarization channels may be combined in a suitable manner, such as by a weighted average operation, in the polarization channel combiner 418 in an effort to provide a combined phasor 420. For some embodiments, each polarization channel may have its own adaptive mixing loop, and the mixed signals from each polarization channel may not be combined, although such embodiments may require more memory and require more computation. Such embodiments may also suffer from problems due to low fringe amplitudes in individual polarization channels, such that a phase estimate cannot be obtained. The combined phasor 420 may be digitally low-pass filtered, such as by an IIR pre-filter, to provide the feedback input phasor 422 for the phase locked oscillator.

In step 506, the phase of the feedback input phasor 422 may be estimated using any suitable method, such as a four quadrant phase extraction function with phase unwrapping between subsequent samples to remove $2\pi$ steps, in the phase estimation block 424. The output of the phase estimation block 424 may be filtered (e.g., by a regulator filter 426 with an integrator function) to generate the sensor phase estimate ($\phi_{est}$) 428. The reference carrier phase ($\phi_{ref}$) 430 may be added to the sensor phase estimate in step 508 to calculate the local oscillator phase ($\phi_{LO}$) 432. In step 510, the local oscillator phase 432 may be converted to a local oscillator phasor 409 for mixing with the detected fringe frequency to complete the adaptive mixing loop. For some embodiments, a fringe frequency estimate defined as the derivative of the sensor phase estimate 428 divided by $2\pi$ and a local oscillator frequency as the derivative of the local oscillator phase 432 divided by $2\pi$, may be calculated instead of the sensor phase estimate 428 and the local oscillator phase 432. Those skilled in the art would realize that defining adaptive mixing in terms of frequency or phase yields corresponding results. Both the phase and frequency of the mixed signal are parameters dependent on the phase of the mixed signal. In yet another embodiment, the local oscillator phasor 409 may be calculated by multiplying together a phasor $\exp[i\phi_{est}]$ calculated from the sensor phase estimate 428 and a phasor $\exp[i\phi_{ref}]$ calculated from the reference carrier phase 430. For this embodiment, no explicit calculation of the local oscillator phase 432 is required.

The mixed signal 410, having a fringe frequency determined by the difference between the detected fringe frequency and the local oscillator frequency, may be low pass filtered and decimated by a factor D in one or more digital low pass/decimation filters 412 in step 512. FIG. 3D shows that the sensor phase has a much lower bandwidth than the fringe signal. Thus, the sensor phase estimate 428 may also be low pass filtered and decimated by the same factor D in one more digital low pass decimation filters 434 similar to decimation filters 412 in step 514. The decimation filters 412 and 434 are typically designed such that the signal energy above the Nyquist frequency of the decimated output is essentially removed. In this way, the sensor signal may be decimated without compromising the signal to noise ratio. In step 516, the sensor phase 416 may be extracted from the decimated mixed signal result 414 and the decimated sensor phase estimate 436 at this reduced sampling rate for a high resolution output signal with increased dynamic range when compared to conventional demodulation techniques, such as those illustrated in FIG. 4A.

The adaptive mixing loop may be designed to stabilize the frequency of the combined phasor 420 and may be implemented such that an error phase amounting to several multiples of $2\pi$ can be handled. In addition, the adaptive mixing loop should ideally never lose track of the input fringe frequency, implying that the feedback gain-bandwidth product should be designed to be as high as possible. Furthermore, the mixed signal 410 at the output of the mixer may be designed to contain most of its essential information within the passband of the decimation filters 412, 434 (e.g., ±3 kHz). This means that the estimated fringe frequency cannot deviate by more than the bandwidth of the decimation filters from the actual fringe frequency. However, the sensor phase estimate 428 may be allowed to deviate significantly from the actual sensor phase 416 at low frequencies (even several times $2\pi$), as long as the deviation in fringe frequency does not become too large. This reduced bandwidth signal may be processed with moderate processing power requirements, significantly lower than the processing power required by conventional demodulation techniques described above.

The fringe signal is a real signal having a Fourier representation that includes a DC-component, a component at the positive fringe frequency, and a component at the negative fringe frequency. However, only the positive fringe frequency is generally of interest. With conventional demodulation techniques, this problem is solved by extracting the signal band around a subcarrier that is applied to the interrogation signal to shift the fringe signal in frequency. In certain interferometer applications, such as OBS sensing, the sensor signal may be so large that the center of the band designated for extraction is shifted away from the subcarrier frequency. With the adaptive mixing techniques according to embodiments of the invention described above, the feedback loop may solve the problem. Therein, the output from the mixer may be low pass filtered to extract the signal around DC, and the sensor phase estimate is calculated from this signal. As long as the feedback loop is locked to the positive fringe frequency component, the signal around DC after mixing is the positive fringe frequency component shifted in frequency. However, when the fringe frequency approaches 0 or the Nyquist frequency, the positive and negative frequency components may overlap, the feedback loop may start to lock on the negative fringe frequency component, and the feedback loop may become unstable.

Significant advantages may also be achieved for some embodiments by filtering the fringe data with a suitable filter, such as a Hilbert transform acting in place of or in series with the optional high pass filter shown in FIG. 4B, in an effort to remove negative frequency components from the data before the polarization channel signals 406 are sent to the mixer and thereby improve the stability of the feedback loop. However, a filter with reasonably narrow transition regions would have a long impulse response and most likely consume significant computation resources.

Figure 6A:
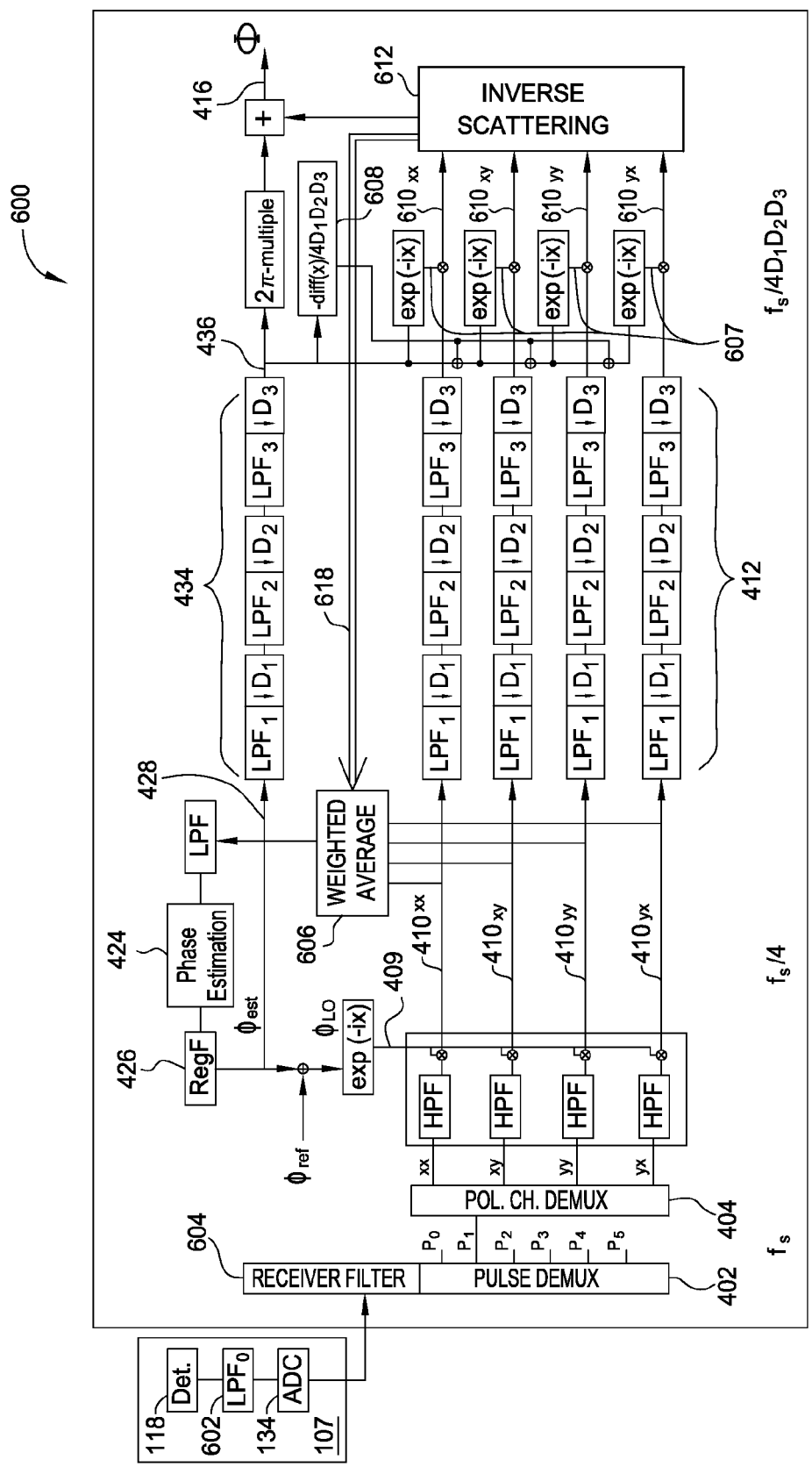
FIGS. 6A-B illustrate implementations of adaptive mixing for interferometric systems in accordance with embodiments of the present invention.

FIG. 6A is a block diagram 600 illustrating an implementation of adaptive mixing with the feedback technique as described above for four polarization channels (e.g., pulse pairs xx, xy, yy, and yx). The receiver 107 may comprise a detector 118, an anti-aliasing filter 602, an A/D converter 134, and a sample/hold circuit 132 (which may be integrated into the A/D converter 134). The sampling frequency of the A/D converter 134 may depend on a number of factors including the Nyquist criterion for sampling the polarization channels, the number of polarization channels per sensor, and the number of sensors being sampled by a single A/D converter. The digitized output of the A/D converter 134 may be coupled to a digital receiver filter 604, which may apply a sampling impulse response before extracting the peak amplitudes of the detected and filtered interference pulses at appropriate times in an effort to produce a number (e.g., six are shown, one for each sensor) of output pulse samples with clock rate $f_s$. The impulse response length of the digital receiver filter 604 may be between 30 and 40 samples, for example. The pulse samples may be distributed to the different sensor processing channels by the sensor demux 402, which may be integrated with the receiver filter 604 as depicted. Only one of the sensor processing channels is illustrated in FIG. 6A. Other sensor processing channels may have similar parallel implementations.

FIG. 6A also illustrates the four sampled, high-pass filtered fringe signals for each polarization channel being mixed with the local oscillator phasor 409 and input to a weighted averager 606 for sensor phase estimation according to the adaptive mixing technique with feedback. The coefficients for the weighted averager 606 may be uploaded for initiation of the adaptive mixing loop.

In FIG. 6A, the mixed signals 410$_{xx}$, 410$_{xy}$, 410$_{yy}$, 410$_{yx}$ are low-pass filtered and decimated by three low-pass filter/decimation stages 412, which may have the same or different decimation factors $D_1$, $D_2$, and $D_3$. Although a single decimation stage with a decimation factor $D_1D_2D_3$ could be used, the computation resources allocated in order to achieve the same filter performance may be significantly reduced by using multiple decimation stages as illustrated. The sensor phase estimate 428 may be filtered and decimated by a similar implementation 434 of the three low-pass filter/decimation stages. The decimation stages may be linear phase finite impulse response (FIR) low pass filters, where the operation of the low pass filtering and the decimation stage may be described mathematically as $$y_j(m) = \sum_{n=1}^{N_j} x_j(D_jm - n)h_j(n) \quad (1)$$

Where $N_j$ is the number of filter coefficients, $h_j$ is the filter coefficient set, $x_j$ is the input signal, $D_j$ is the decimation factor, and $y_j$ is the decimated output signal. The input and output signals $x_j$ and $y_j$ may be complex in the mixed signal stages 412, but may be real in the estimated sensor phase stages 434. After decimation, the effective sample rate may be $f_s/(4D_1D_2D_3)$ for all five channels.

Figure 7A:
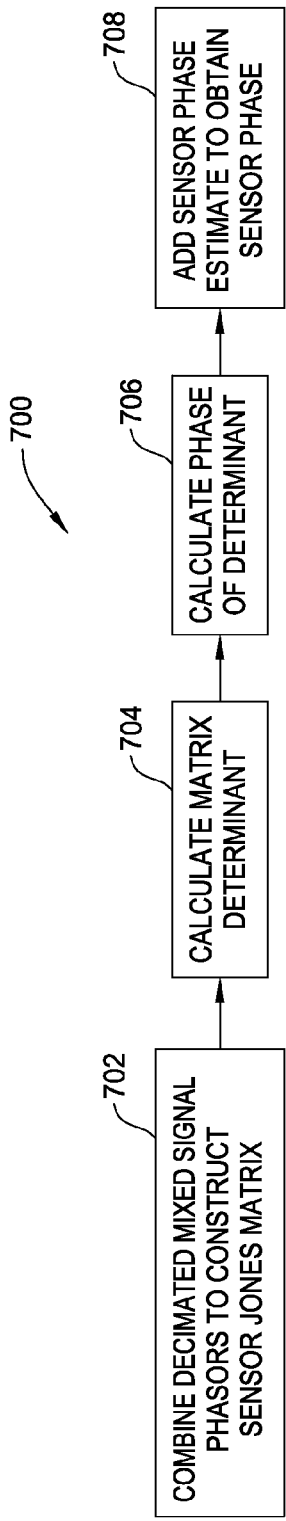
FIGS. 7A-B are flow diagrams showing different methods of combining the sensor phase estimate and the mixed signal phasors from adaptive mixing to obtain the sensor phase in accordance with embodiments of the present invention.

For some embodiments, combining the decimated sensor phase estimate ($\phi_{est,d}$) 436 and the phase extracted from the decimated mixed signal phasors 414 in step 516 may be done directly as shown in the flow diagram 700 of FIG. 7A. In step 702, the decimated mixed signal phasors 414 may be combined to construct a sensor Jones matrix indicating the difference between the two optical propagation paths through the demodulated sensor as described in detail in the commonly owned U.S. Pat. No. 7,081,959, entitled "Method and Apparatus for Providing Polarization Insensitive Signal Processing for Interferometric Sensors," herein incorporated by reference. The determinant (D) of the sensor Jones matrix may be calculated in step 704, where the determinant is equal to the decimated sample of polarization channel xx multiplied with the decimated sample of polarization channel yy minus the decimated samples of polarization channels xy and yx multiplied together (i.e., $D=S_{xx,d}S_{yy,d}-S_{xy,d}S_{yx,d}$). In step 706 the phase of the determinant may be calculated, and then the sensor phase estimate 428 may be added to the phase of the determinant to obtain the sensor phase ($\Phi$) 416 in step 708.

Figure 7B:
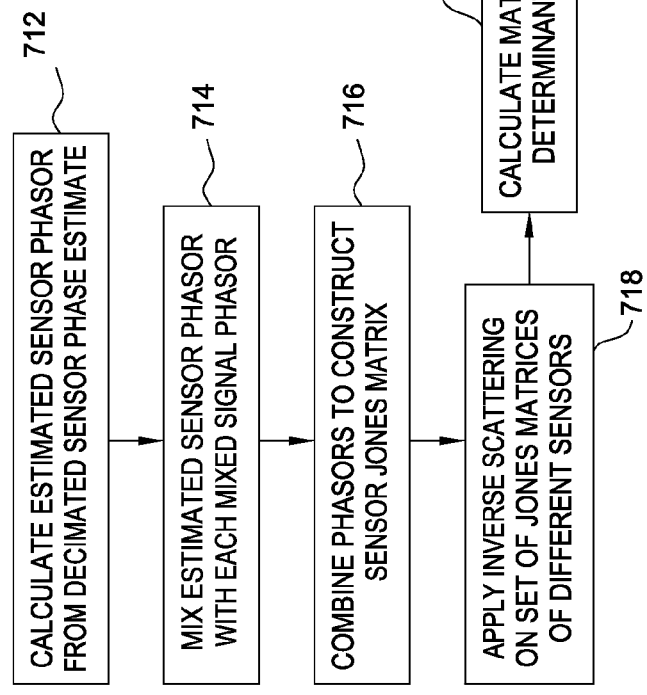

For other embodiments as shown in FIG. 6A, the decimated sensor phase estimate ($\phi_{est,d}$) 436 and the decimated mixed signal phasors 414 may be combined in step 516 according to the flow diagram 710 of FIG. 7B. In step 712, an estimated sensor phasor 607 may be calculated from $\phi_{est,d}$ 436. The estimated sensor phasor 607 may be mixed with each decimated mixed signal phasor 414 in step 714. Since the polarization channels pulse pairs are measured at different points in time according to the TDM interrogation interval, the delay difference between the polarization channels may need to be corrected. The diff(x)/4$D_1 D_2 D_3$ function 608 may interpolate the decimated sensor phase estimate $\phi_{est,d}$ 436 in an effort to remove this delay difference from each of the polarization channels.

The corrected polarization channels 610 may be combined in step 716 to construct a sensor Jones matrix, and in step 718, inverse scattering may be applied on the set of Jones matrices for different sensors in an inverse scattering function 612 as depicted in FIG. 6A. The determinant (D=$S_{xx,d}S_{yy,d}$−$S_{xy,d}S_{yx,d}$ as described above) of the sensor Jones matrix may be calculated in step 720, and the phase of the determinant may be calculated and divided by two in step 722. This phase may have a range [−π/2, π/2]. To expand this range to [−π, π], the phase of the individual polarization channels may be calculated and compared with the phase calculated from the determinant in order to determined whether π should be added to the determinant phase. The resulting phase represents the deviation of the sensor phase from a 2π multiple of the sensor phase estimate. Furthermore, because only the sensor phase modulus 2π is added by the mixer, 2π multiples of the sensor phase estimate 428 may be added to the phase of the determinant to yield the sensor phase (Φ) 416 in step 724.

For many embodiments, the sensor phase estimate ($\phi_{est}$) 428 may have a large offset from the actual sensor phase that can vary relatively slowly with time, and the local oscillator phase ($\phi_{LO}$) 432 may have a large, but slowly varying offset from the phase of the detected interference fringes. Such slowly varying phase offsets may be allowed as long as the bandwidth of the mixed signal does not exceed the bandwidth capacity of the processing channel that analyzes the output from the mixer.

Figure 6B:
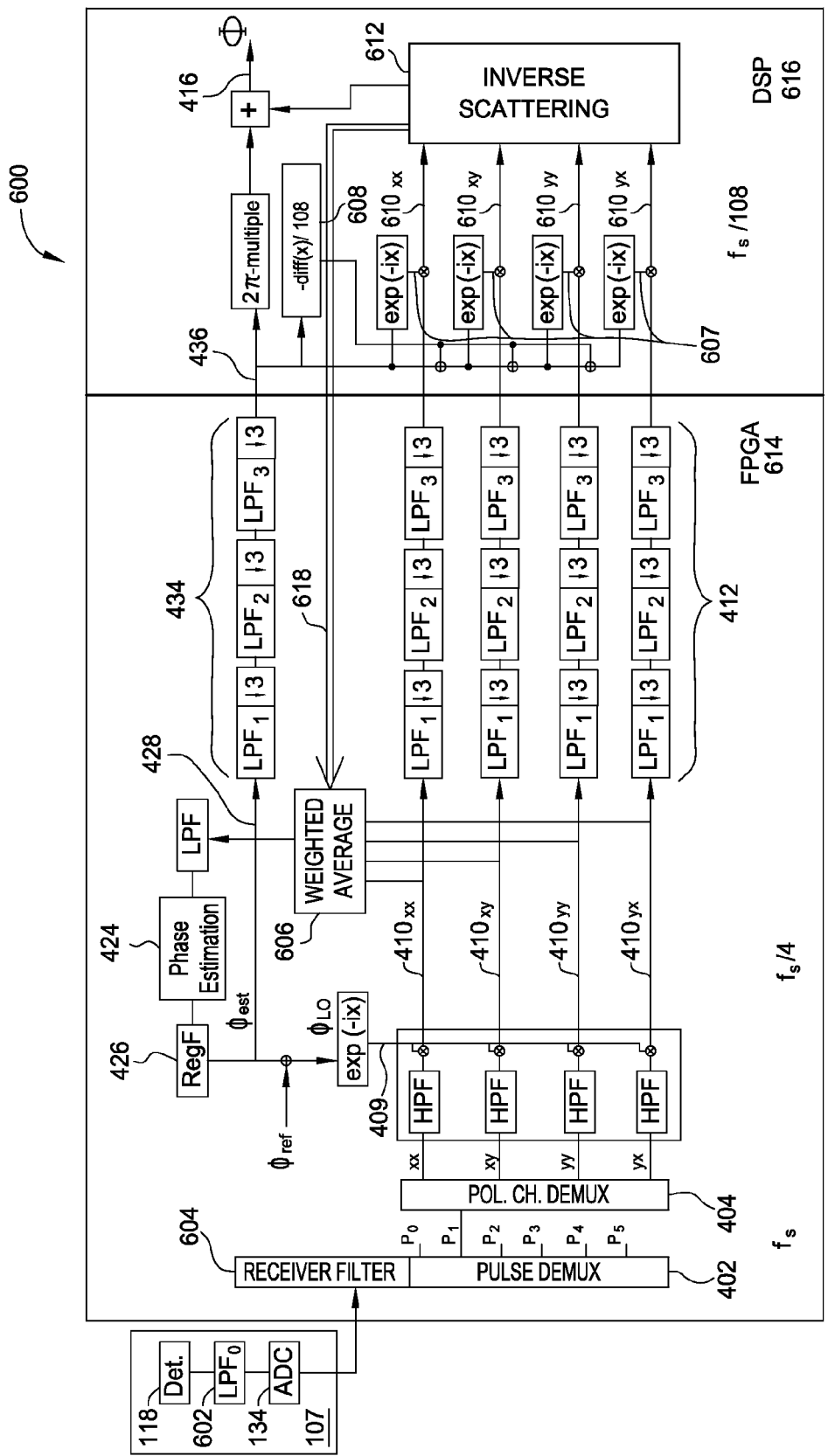

FIG. 6B illustrates a more specific embodiment of adaptive mixing block diagram 600 of FIG. 6A where the functions are performed in more than one integrated circuit (IC). For example, steps 504 through 514 may be implemented in a field programmable gate array (FPGA) 614, while the combination of the decimated mixed signal phasor 414 and the decimated sensor phase estimate 436 to calculate the sensor phase 416 in step 516 may be implemented in a digital signal processor (DSP) 616. An FPGA is generally very flexible, scalable, and allows execution of several functions simultaneously. An FPGA may also be very useful for implementation of simple processing tasks at high speed that require significant computational resources, such as decimation and filtering. Calculation of a phase from a complex phasor or vice versa may be done on the FPGA using the well-known CORDIC algorithm. Once the data rate is sufficiently reduced by decimation, the DSP 616 may execute the remaining processing steps. Compared to the FPGA 614, the DSP 616 may be much easier to program and more suitable for complex processing tasks at lower data rates, such as inverse scattering.

In such embodiments, data from the demodulator in the FPGA 614 may be transmitted to the DSP 616 for further processing across a suitable interface, such as a plurality of serial ports. The DSP 616 may also transfer data, such as the weighting coefficients 618 for the weighted averager 606, to the FPGA 614 across the same or another interface, such as a parallel port. In FIG. 6B, the low pass filter/decimation stages 412, 434 decimate by a factor of 27 in three stages each having a decimation factor of 3 (i.e., $D_1=D_2=D_3=3$). For such embodiments, the effective rate of the sampled polarization channels may be $f_s/108$ and the diff(x)/4$D_1 D_2 D_3$ function 608 may be a diff(x)/108 function as shown.

Another Exemplary Method of Adaptive Mixing

Figure 4C:
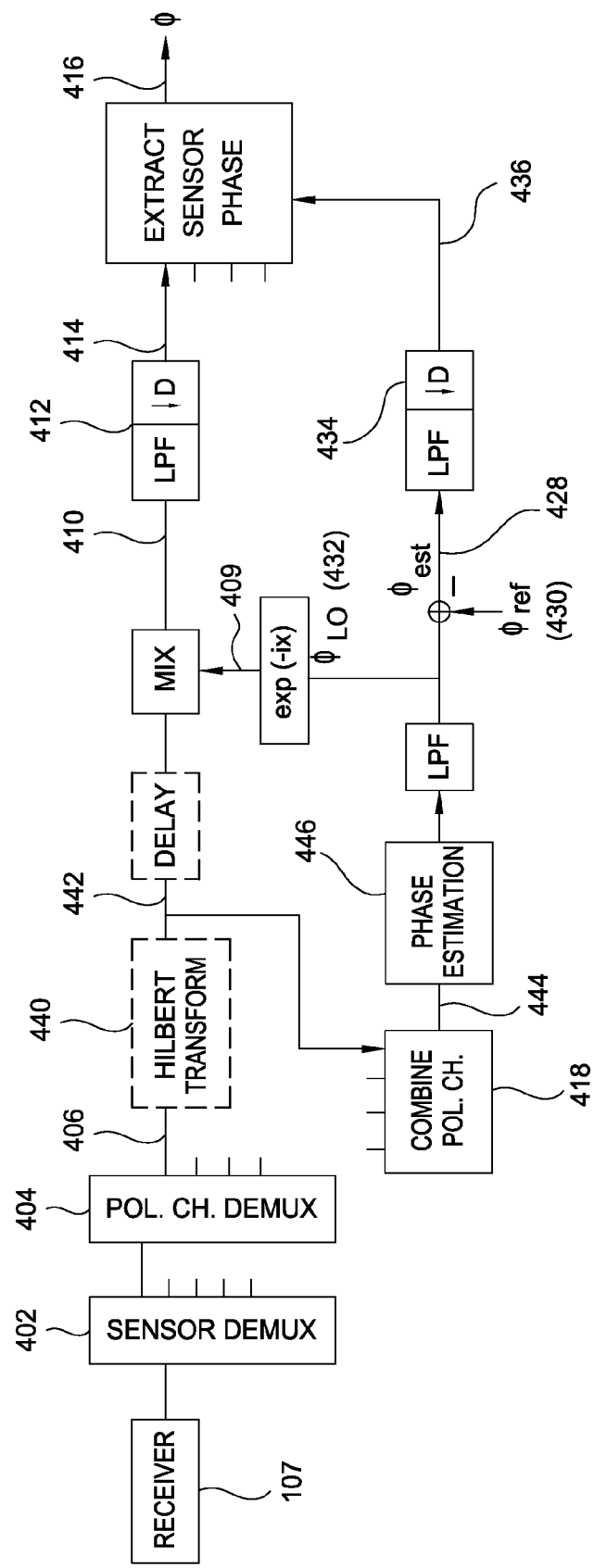
Figure 5B:
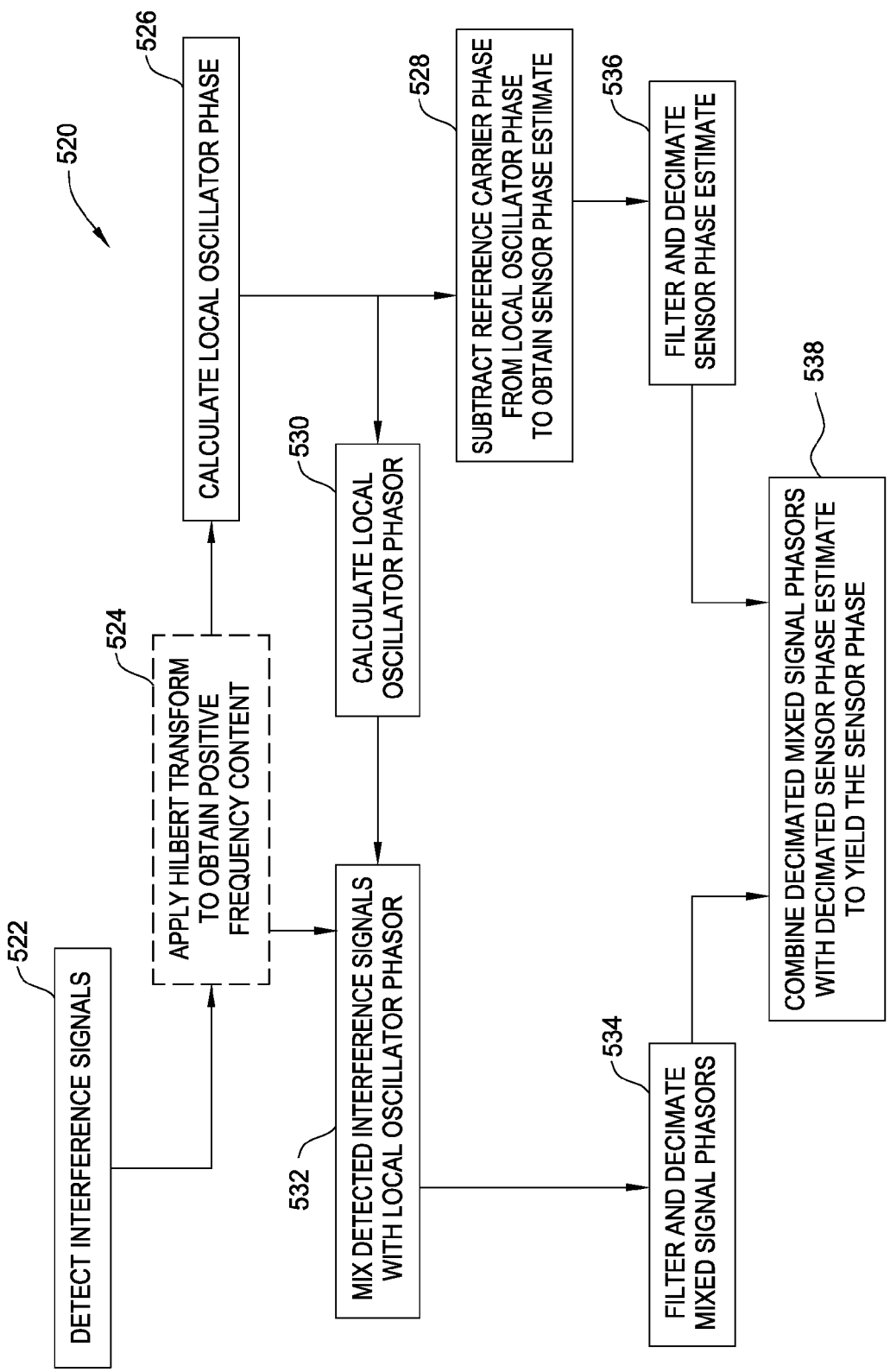

The block diagram of FIG. 4C and the flow diagram 520 of FIG. 5B illustrate a different approach to adaptive mixing in accordance with embodiments of the present invention, which may be considered as a feed-forward adaptive mixing technique. Rather than calculating the sensor phase estimate in a feedback loop after mixing occurs, the feed-forward technique may calculate the sensor phase estimate before mixing. With this approach, the stability of the adaptive mixing loop may be independent of the loop delay in the feedback loop. The adaptive mixing loop may not even be causal, meaning that samples of the fringe signal that are ahead (in time) of the current sample at the mixer input may be taken into account to calculate the sensor phase estimate.

In step 522, the receiver 107 may detect the reflected interferometric signals from the interferometric sensor(s) sampled at the sampling frequency ($f_s$) and may convert them to digital signals to be processed by the control and signal processing unit 122, for example. The received signals may be separated according to the associated sensor by the sensor demux 402 and according to the polarization channel by the polarization channel demux 404.

The input for phase calculation is typically complex, so an optional Hilbert transform 440 may be applied in step 524 in an effort to extract the positive frequency content of the polarization channel signal 406. For other embodiments, the frequency of the polarization channel signal 406 may be measured by determining the time delay between zero crossings, in which case a Hilbert transform need not be used.

In step 526, the transformed polarization channel signals 442 may be combined in a suitable manner, such as by a weighted average operation, in the polarization channel combiner 418 in an effort to provide a representative input 444 for phase estimation. The representative input 444 may be passed through the phase estimation block 446 and low pass filtered, such as by an FIR filter, to produce the local oscillator phase ($\phi_{LO}$) 432. For some embodiments, the polarization channel combiner 418 and phase estimation block 446 may comprise calculating the phase of the determinant (D=$S_{xx,t}S_{yy,t}$−$S_{xy,t}S_{yx,t}$) of the transformed polarization channel signals 442.

In step 528, the reference carrier phase ($\phi_{ref}$) 430 may be subtracted from the local oscillator phase 432 to obtain the sensor phase estimate ($\phi_{est}$) 428. A local oscillator phasor 409 for mixing may be calculated from the local oscillator phase ($\phi_{LO}$) 432 in step 530.

In step 532, a delayed version of the transformed polarization channel signal 442 may be mixed with the local oscillator phasor 409 to generate a mixed signal 410. This delay should compensate for the group delay of processing steps 526 and 530. The mixed signals 410, representing a difference frequency between the detected fringe frequency and the local oscillator frequency, may be low pass filtered and decimated by a factor D in one or more digital low pass/decimation filters 412 in step 534. The sensor phase estimate ($\phi_{est}$) 428 may also be low pass filtered and decimated by the same factor D in one more digital low pass decimation filters 434 similar to decimation filters 412 in step 536. In step 538, the sensor phase (Φ) 416 may be extracted from the decimated mixed signal result 414 and the decimated sensor phase estimate 436 at this reduced sampling rate for a high resolution output signal with increased dynamic range when compared to conventional demodulation techniques, such as those illustrated in FIG. 4A.

An Exemplary Nonlinear Adaptive Mixing Technique

Figure 8A:
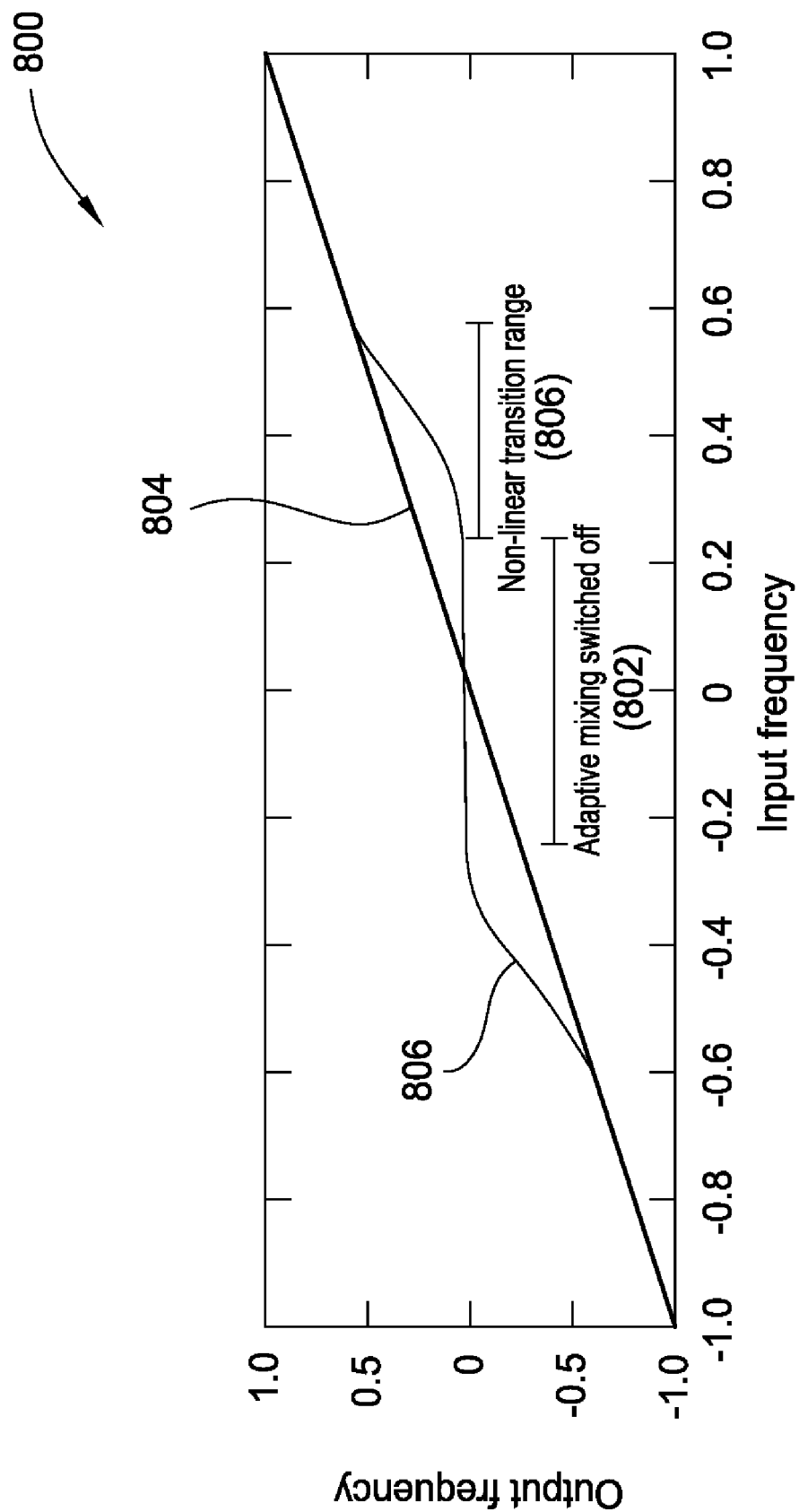
FIG. 8A is a graph of a nonlinear transform for adaptive mixing in accordance with an embodiment of the present invention.
Figure 8B:
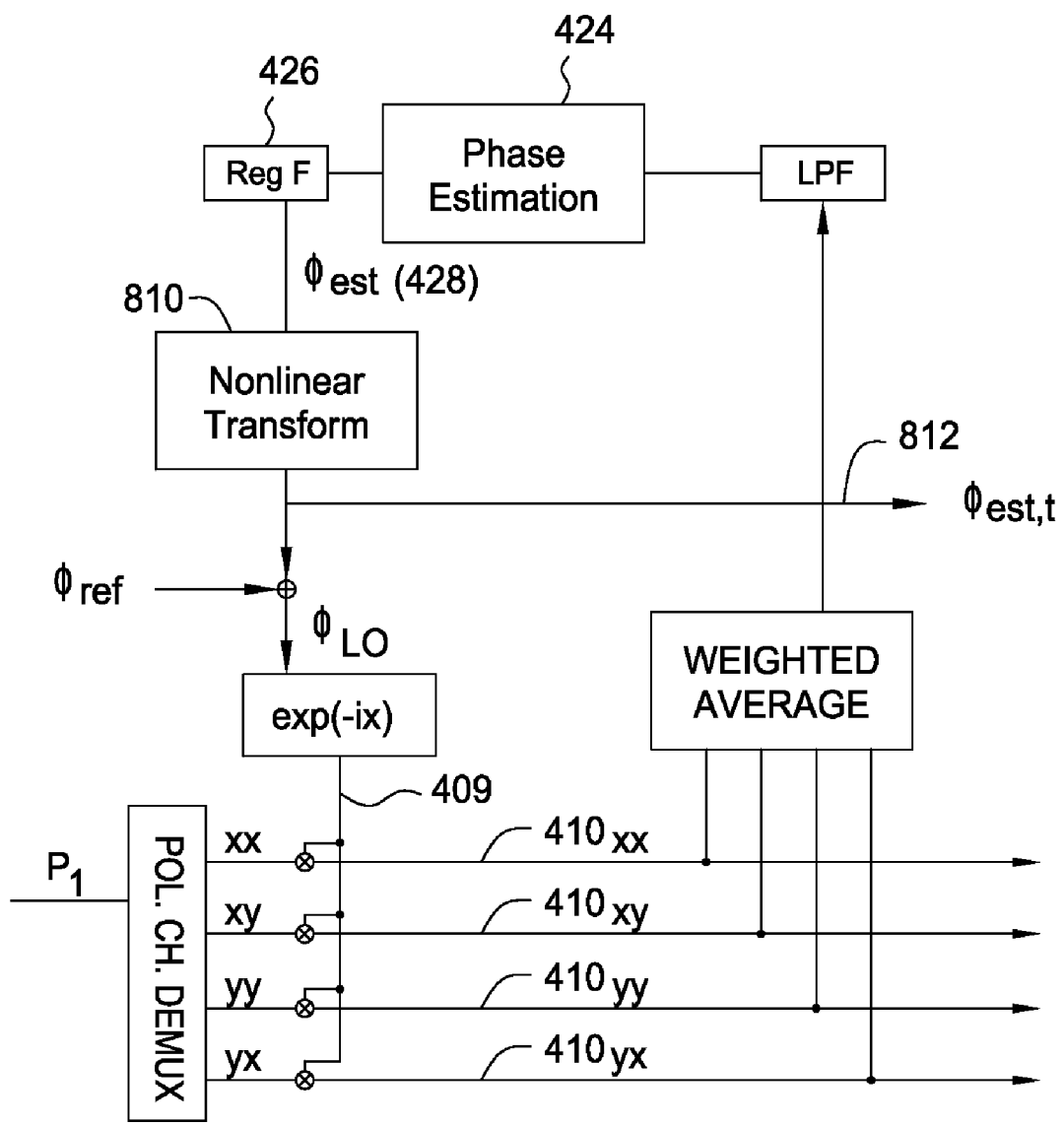
FIG. 8B is a block diagram for implementing the nonlinear transform for adaptive mixing of FIG. 8A in accordance with an embodiment of the present invention.

Due to ripple in the decimation filters 434, among other components of the digital signal processing chain, adaptive mixing may be switched off for small phase signal amplitudes as shown in the "Off" region 802 of the graph 800 of FIG. 8A for some embodiments. Ripple in the decimation filters with adaptive mixing may cause the layer-peeling algorithm not to function correctly in embodiments where the layer-peeling algorithm is used for inverse scattering. Therefore, a nonlinear transform 810 may be implemented in the adaptive mixing loop according to the graph 800. For some embodiments as shown in FIG. 8B, the nonlinear transform 810 may be implemented between the calculation of the sensor phase estimate ($\phi_{est}$) 428 and the summation with the reference carrier ($\phi_{ref}$) 430 in the frequency domain to form a transformed sensor phase estimate ($\phi_{est,t}$) 812.

For some embodiments where the nonlinear transform operates in the frequency domain, the input (i.e., the sensor phase estimate 428) may be transformed into the frequency domain by calculating an input phase change rate, for example. After the nonlinear transformation is executed on the input phase change rate to determine an output phase change rate, the inverse operation may be performed in an effort to transform the output phase change rate back into the phase domain.

Line 804 illustrates a linear 1:1 correspondence between input frequencies and output frequencies if the nonlinear transform 810 was not used or was bypassed. The nonlinear transform 810 may force a small band of input fringe frequency estimates near zero to be output with a fringe frequency estimate of 0. For some embodiments where the sampling frequency is about 820 kHz, the bandwidth of the "Off" region 802 may be about ±1 kHz. To get back to the line 804 where adaptive mixing functions to estimate the frequency normally, the nonlinear transform may include a non-linear transition region 806 joining the line 804 to the "Off" region 802 for a continuous, monotonic transition rather than a piecewise linear function.

While the foregoing is directed to embodiments of the present invention, other and further embodiments of the invention may be devised without departing from the basic scope thereof, and the scope thereof is determined by the claims that follow.

The invention claimed is:

1. A method for detecting a sensor phase in an interferometric system, the method comprising:
   mixing a detected interference signal with a local oscillator phasor in one or more steps to create a mixed signal;
   obtaining a parameter dependent on the phase of the mixed signal;
   obtaining the local oscillator phasor based on the parameter dependent on the phase of the mixed signal;
   signal processing the mixed signal and the parameter dependent on the phase of the mixed signal;
   extracting the sensor phase from the processed mixed signal and the processed parameter; and
   outputting the sensor phase to a display.

2. The method of claim 1, wherein the parameter dependent on the phase of the mixed signal comprises the phase or the frequency of the mixed signal.

3. The method of claim 1, wherein calculating the local oscillator phasor comprises:
   amplifying and filtering the parameter dependent on the phase of the mixed signal to obtain a sensor phase or frequency estimate;
   adding a reference carrier phase or frequency to the sensor phase or frequency estimate to obtain a local oscillator phase or frequency; and
   converting the local oscillator phase or frequency to the local oscillator phasor.

4. The method of claim 3, further comprising:
   applying a nonlinear transform to the frequency estimate such that small values of the frequency estimate near zero are forced to zero; and
   using the nonlinearly transformed frequency estimate as the frequency estimate in remaining steps.

5. The method of claim 1, wherein the detected interference signal is one of a plurality of detected interference signals, each from a different polarization channel.

6. The method of claim 5, further comprising:
   combining mixed signals from the plurality of detected interference signals, each from a different polarization channel, using a weighted average; and
   obtaining the parameter based on the weighted average of the mixed signals.

7. The method of claim 5, further comprising:
   forming a Jones matrix using the mixed signals from the plurality of detected interference signals, each from a different polarization channel;
   calculating a determinant of the Jones matrix; and
   obtaining the parameter based on the phase of the determinant of the Jones matrix.

8. The method of claim 5, wherein extracting the sensor phase comprises:
   constructing a sensor Jones matrix based on each processed mixed signal from the plurality of detected interference signals;
   calculating a determinant of the sensor Jones matrix;
   calculating a phase of the determinant; and
   adding the processed parameter dependent on the phase of the mixed signal to the phase of the determinant divided by two to obtain the sensor phase.

9. The method of claim 5, wherein the processed parameter dependent on the phase of the mixed signal is a decimated sensor phase estimate and wherein extracting the sensor phase comprises:
   obtaining an estimated sensor phasor from the decimated sensor phase estimate;
   mixing the estimated sensor phasor with each processed mixed signal from the plurality of detected interference signals;
   constructing a sensor Jones matrix based on the plurality of mixed signal phasors;
   applying inverse scattering to the sensor Jones matrix;
   calculating a determinant of the sensor Jones matrix;
   calculating a phase of the determinant; and
   adding $2\pi$ multiples of the decimated sensor phase estimate to the phase of the determinant divided by two to obtain the sensor phase.

10. A method for detecting a sensor phase in an interferometric system, the method comprising:
    shifting a detected interference signal in frequency by an estimated frequency;
    obtaining a parameter dependent on the phase of the frequency-shifted signal;
    obtaining the estimated frequency based on the parameter dependent on the phase of the frequency-shifted signal;
    signal processing the frequency-shifted signal and the parameter dependent on the phase of the frequency-shifted signal;
    extracting the sensor phase from the processed frequency-shifted signal and the processed parameter; and
    outputting the sensor phase to a display.

11. The method of claim 10, wherein the parameter dependent on the phase of the frequency-shifted signal comprises the phase or the frequency of the frequency-shifted signal.

12. A method for detecting a sensor phase in an interferometric system, comprising:
    estimating a parameter dependent on the phase of a detected interference signal;
    obtaining a local oscillator phasor based on the parameter dependent on the phase of the detected interference signal;
    mixing the detected interference signal with the local oscillator phasor in one or more steps to create a mixed signal phasor;
    signal processing the mixed signal phasor and the parameter dependent on the phase of the detected interference signal;
    extracting the sensor phase from the processed mixed signal phasor and the processed parameter; and
    outputting the sensor phase to a display.

13. The method of claim 12, wherein the parameter comprises the phase or the frequency of the detected interference signal.

14. The method of claim 12, wherein the local oscillator phasor has a frequency that is similar to a frequency of the detected interference signal.

15. The method of claim 12, further comprising removing negative frequency components from the detected interference signal before estimating the parameter dependent on the phase of the detected interference signal and before mixing the detected interference signal with the local oscillator phasor.

16. The method of claim 12, further comprising adding a delay to the detected interference signal to compensate for the group delay in estimating the parameter.

17. The method of claim 12, further comprising:
    applying a nonlinear transform to the estimated parameter; and
    using the nonlinearly transformed estimated parameter as the estimated parameter in remaining steps.

18. The method of claim 12, wherein the detected interference signal is one of a plurality of detected interference signals, each from a different polarization channel.

19. The method of claim 18, farther comprising combining the plurality of detected interference signals, each from a different polarization channel, using a weighted average such that the estimated parameter is based on the weighted average of the plurality of detected interference signals.

20. The method of claim 18, further comprising:
    forming a Jones matrix using the plurality of detected interference signals, each from a different polarization channel;
    calculating a determinant of the Jones matrix; and
    obtaining the estimated parameter based on the phase of the determinant of the Jones matrix.

21. The method of claim 18, wherein extracting the sensor phase comprises:
    constructing a sensor Jones matrix based on each processed mixed signal from the plurality of detected interference signals;
    calculating a determinant of the sensor Jones matrix;
    calculating a phase of the determinant; and
    adding the processed parameter dependent on the phase of the mixed signal to the phase of the determinant divided by two to obtain the sensor phase.

22. The method of claim 18, wherein the processed parameter dependent on the phase of the mixed signal is a decimated sensor phase estimate and wherein extracting the sensor phase comprises:
    calculating an estimated sensor phasor from the decimated sensor phase estimate;
    mixing the estimated sensor phasor with each processed mixed signal from the plurality of detected interference signals to form a plurality of mixed signal phasors;
    constructing a sensor Jones matrix based on the plurality of mixed signal phasors;
    applying inverse scattering to the sensor Jones matrix;
    calculating a determinant of the sensor Jones matrix;
    calculating a phase of the determinant; and
    adding $2\pi$ multiples of the decimated sensor phase estimate to the phase of the determinant divided by two to obtain the sensor phase.

23. An interferometric system comprising:
    a plurality of optical sensors;
    a transmitter configured to transmit optical signals to the plurality of optical sensors;
    a receiver configured to detect interference signals produced by the plurality of optical sensors and based on the transmitted optical signals; and
    a signal processing unit configured, for each of the detected interference signals, to mix the detected interference signal with a local oscillator phasor in one or more steps to create a mixed signal, obtain a parameter dependent on the phase of the mixed signal, obtain the local oscillator phasor based on the parameter, signal process the mixed signal and the parameter, and extract the sensor phase from the processed mixed signal and the processed parameter.

24. The system of claim 23, wherein the plurality of optical sensors comprises fiber Bragg gratings (FBGs).

25. An interferometric system comprising:
    a plurality of optical sensors;
    a transmitter configured to transmit optical signals to the plurality of optical sensors;
    a receiver configured to detect interference signals produced by the plurality of optical sensors and based on the transmitted optical signals; and
    a signal processing unit configured, for each of the detected interference signals, to estimate a parameter dependent on the phase of the detected interference signal, obtain a local oscillator phasor based on the parameter, mix the detected interference signal with the local oscillator phasor in one or more steps to create a mixed signal phasor, signal process the mixed signal phasor and the parameter, and combine the processed mixed signal phasor with the processed parameter to extract the sensor phase.

* * * * *

UNITED STATES PATENT AND TRADEMARK OFFICE
CERTIFICATE OF CORRECTION

PATENT NO. : 7,715,015 B2 Page 1 of 1
APPLICATION NO. : 11/924409
DATED : May 11, 2010
INVENTOR(S) : Waagaard et al.

It is certified that error appears in the above-identified patent and that said Letters Patent is hereby corrected as shown below:

In the Claims:

Column 17, Claim 19, Line 43, please delete "farther" and insert --further-- therefor.

Signed and Sealed this

Thirty-first Day of August, 2010

David J. Kappos
*Director of the United States Patent and Trademark Office*